(12) United States Patent
Yasukawa et al.

(10) Patent No.: US 10,728,881 B2
(45) Date of Patent: Jul. 28, 2020

(54) USER EQUIPMENT AND SIGNAL TRANSMISSION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN); Liu Liu, Beijing (CN); Anxin Li, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,924

(22) PCT Filed: Apr. 14, 2017

(86) PCT No.: PCT/JP2017/015354
§ 371 (c)(1),
(2) Date: Nov. 8, 2018

(87) PCT Pub. No.: WO2017/195531
PCT Pub. Date: Nov. 16, 2017

(65) Prior Publication Data
US 2019/0159224 A1    May 23, 2019

(30) Foreign Application Priority Data

May 12, 2016 (JP) ................................ 2016-096574

(51) Int. Cl.
*H04W 72/04* (2009.01)
*H04W 4/90* (2018.01)
(Continued)

(52) U.S. Cl.
CPC ............ *H04W 72/04* (2013.01); *H04W 4/40* (2018.02); *H04W 4/90* (2018.02); *H04W 24/10* (2013.01);
(Continued)

(58) Field of Classification Search
CPC ....... H04W 72/04; H04W 4/90; H04W 76/14; H04W 4/40; H04W 24/10; H04W 72/02;
(Continued)

(56) References Cited

U.S. PATENT DOCUMENTS

2016/0212609 A1    7/2016 Fujishiro et al.
2017/0041773 A1*   2/2017 Fujishiro ............... H04W 8/005
(Continued)

FOREIGN PATENT DOCUMENTS

JP    2016-019114 A    2/2016
WO    2016/013538 A1   1/2016
(Continued)

OTHER PUBLICATIONS

International Search Report issued in corresponding International Patent Application No. PCT/JP2017/015354, dated Jul. 4, 2017 (2 pages).
(Continued)

*Primary Examiner* — Eric Myers
(74) *Attorney, Agent, or Firm* — Osha Liang LLP

(57) ABSTRACT

There is provided user equipment of a radio communication system that supports D2D communication. The user equipment includes a storage that stores a Gap pattern indicating a Gap period repeatedly configured in a radio resource for UL; and a transmitter that transmits a signal of D2D communication in a Gap period indicated by the Gap pattern stored in the storage.

4 Claims, 23 Drawing Sheets

(51) Int. Cl.
*H04W 72/02* (2009.01)
*H04W 92/18* (2009.01)
*H04W 76/14* (2018.01)
*H04W 4/40* (2018.01)
*H04W 24/10* (2009.01)
*H04W 72/12* (2009.01)

(52) U.S. Cl.
CPC ....... *H04W 72/02* (2013.01); *H04W 72/1215* (2013.01); *H04W 72/1242* (2013.01); *H04W 76/14* (2018.02); *H04W 92/18* (2013.01); *H04W 72/0446* (2013.01)

(58) Field of Classification Search
CPC ......... H04W 72/1215; H04W 72/1242; H04W 92/18; H04W 72/0446
See application file for complete search history.

(56) References Cited

U.S. PATENT DOCUMENTS

2017/0164249 A1 6/2017 Uemura et al.
2017/0230815 A1 8/2017 Yasukawa et al.

FOREIGN PATENT DOCUMENTS

WO 2016/021653 A1 2/2016
WO 2016/021703 A1 2/2016

OTHER PUBLICATIONS

Written Opinion issued in corresponding International Patent Application No. PCT/JP2017/015354, dated Jul. 4, 2017 (6 pages).
NTT DOCOMO, "Details of prioritizing sidelink transmissions over UL transmissions", 3GPP TSG RAN WG1 Meeting #85, R1-165197, Nanjing, China, May 23-27, 2016 (3 pages).
3GPP Seminar, LTE Asia, "Key drivers for LTE success: Services Evolution", Sep. 6, 2011 (15 pages).
3GPP TS 36.300, V13.2.0, "3rd Generation Partnership Project; Technical Specification Group Radio Access Network; Evolved Universal Terrestrial Radio Access (E-UTRA) and Evolved Universal Terrestrial Radio Access Netowrk (E-UTRAN); Overall description; Stage 2 (Release 13)," Dec. 2015 (290 pages).
3GPP TS 36.331, V13.1.0, "3rd Generation Partnership Project; Technical Specification Group Radio Access Network; Evolved Universal Terrestrial Radio Access (E-UTRA); Radio Resource Control (RRC); Protocol specification (Release 13)," Mar. 2016 (551 pages).

* cited by examiner

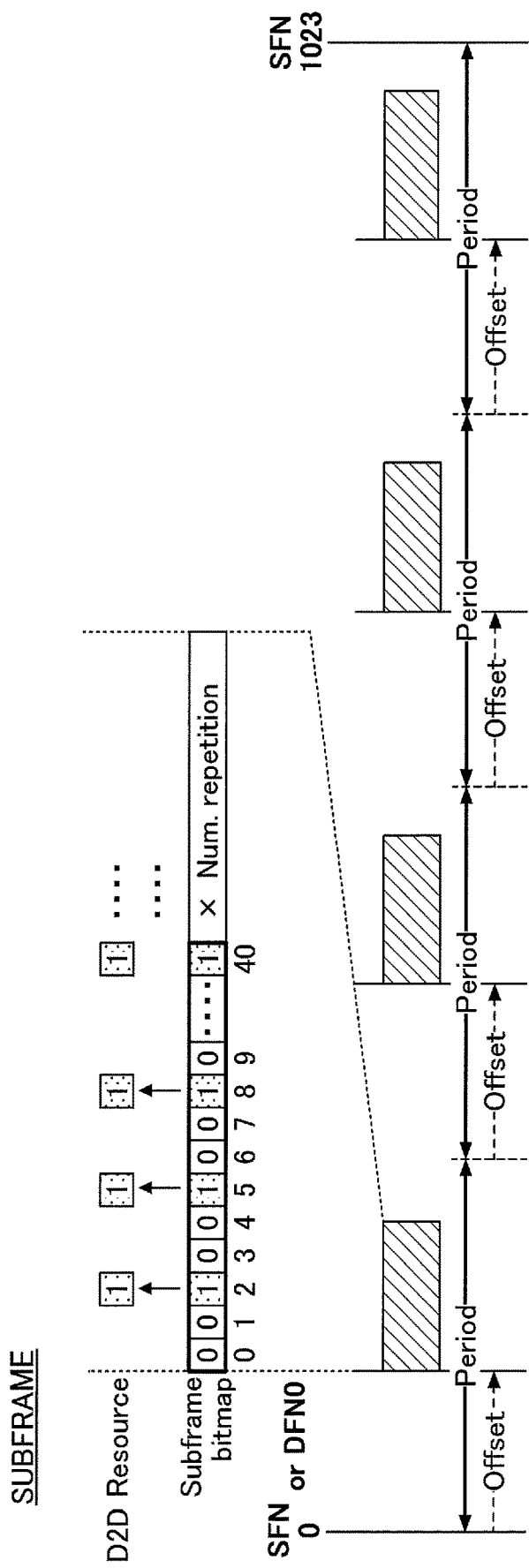

RESOURCE BLOCK

FIG.10

```
SL-GapPattern-r13    ::=    SEQUENCE {
    gapPeriod-r13           ENUMERATED {sf40, sf60, sf70, sf80, sf120, sf140, sf160,
                                        sf240, sf280, sf320, sf640, sf1280, sf2560, sf5120,
                                        sf10240},
    gapOffset-r12           SL-OffsetIndicator-r12,
    gapSubframeBitmap-r13   BIT STRING (SIZE (1..10240)),
    ...
}
```

USER EQUIPMENT AND SIGNAL TRANSMISSION METHOD

TECHNICAL FIELD

The present invention relates to user equipment and a signal transmission method.

BACKGROUND ART

In Long Term Evolution (LTE) and successor systems (for example, also referred to as LTE Advanced (LTE-A), 4G, Future Radio Access (FRA), 5G, and the like) of LTE, Device to Device (D2D) technology has been studied in which units of user equipment directly communicate with each other without going through a radio base station (for example, Non-Patent Document 1).

D2D reduces the traffic between the user equipment and the base station, or enables communication between units of user equipment even when communication with the base station is not possible in the event of a disaster or the like.

D2D is classified roughly according to D2D discovery (D2D discovery, which is also referred to as D2D detection) for finding any other communicable user equipment and D2D communication (also referred to as D2D direct communication, D2D communication, inter-terminal direct communication, and the like) for performing direct communication between units of user equipment. Hereinafter, when D2D communication, D2D discovery, and the like are not particularly distinguished from each other, these are simply referred to as D2D. In addition, a signal transmitted and received by D2D is referred to as a D2D signal.

In addition, in 3rd Generation Partnership Project (3GPP), it has been studied to implement V2X by extending the D2D function. Here, the V2X is a part of Intelligent Transport Systems (ITS). As shown in FIG. 1, the V2X is a generic term for Vehicle to Vehicle (V2V) that means a mode of: communication performed between vehicles, Vehicle to Infrastructure (V2I) that means a mode of communication performed between a vehicle and a Road-Side Unit (HSU) installed at the side of the road, Vehicle to Nomadic device (V2N) that means a mode of communication performed between a vehicle and a mobile terminal of the driver, and Vehicle to Pedestrian (V2P) that means a mode of communication performed between a vehicle and a mobile terminal of a pedestrian.

Prior Art Document

[Non-Patent Document]
Non-Patent Document 1: "Key drivers for LTE success: Services Evolution", September 2011, 3GPP, Internet URL: http://www.3gpp.org/ftp/Information/presentations/presentations_2011/2011_09_LTE_Asia/2011_LTE-Asia_3GPP_Service_evolution.pdf
Non-Patent Document 2: 3GPP TS36.300 V13.2.0 (2015-12)
Non-Patent Document 3: 3GPP TS36.331 V13.1.0 (2016-03)

SUMMARY OF THE INVENTION

Problem to be Solved by the Invention

In V2X, it is assumed that various types of data are transmitted and received. For example, a case where data with a high priority, such as data indicating the occurrence of an accident between vehicles, is transmitted and received, a case where semi-persistent data is transmitted and received at a predetermined period (for example, a period of 100 ms), and the like are assumed.

Here, the technology of D2D which is the base of V2X is based on the assumption that some of resources for UL (Uplink) are used for transmission and reception of D2D signals. In specifications (Rel-12 and Rel-13) of D2D in the current 3GPP, various specifications are defined on the assumption that UL communication takes precedence over D2D communication.

In V2X, since transmission and reception of data with a high priority are assumed as described above, it is thought that it is necessary to give priority to V2X communication over UL communication as required. However, since the specifications of D2D in the current 3GPP are basically defined on the assumption that UL communication takes precedence, a problem is that V2X communication may not be prioritized. In addition, considering that V2X is a type of D2D, the above-described problem is not limited to V2X, but is a problem that can occur in general in D2D communication with a high priority.

There is a need for a technique capable of preferentially performing D2D communication depending on necessity.

Means for Solving the Problem

According to an aspect of the present invention, there is provided user equipment of a radio communication system that supports D2D communication including a storage that stores a Gap pattern indicating a Gap period repeatedly configured in a radio resource for UL; and a transmitter that transmits a signal of the D2D communication in a Gap period indicated by the Gap pattern stored in the storage.

Advantage of the Invention

According to the disclosed technology, there is provided a technique that allows to preferentially perform D2D communication depending on necessity.

BRIEF DESCRIPTION OF DRAWINGS

FIG. 8A is a diagram illustrating a resource pool configuration.

FIG. 10 is a diagram illustrating information elements for setting a Gap pattern;

EMBODIMENTS OF THE INVENTION

Hereinafter, an embodiment of the invention is described with reference to the diagrams. In addition, the embodiment described below is merely an example, and embodiments to which the invention is applied are not limited to the following embodiment. For example, a radio communication system according to the present embodiment is assumed to be a system using a method based on the LTE. However, the invention is not limited to the LTE, but can be applied to other methods. In addition, in this specification and the appended claims, "LTE" is used in a broad sense including not only the communication method corresponding to the release 8 or 9 of 3GPP but also the fifth generation communication methods corresponding to the release 10, 11, 12, and 13 or the release 14 and subsequent ones of 3GPP.

In addition, although the present embodiment is mainly for V2X, the technique according to the present embodiment is not limited to V2X but can be applied to D2D in general. In addition, "D2D" includes V2X as its meaning.

In addition, "D2D" is used in a broad sense including not only a process for transmitting and receiving the D2D signal between the units of user equipment UE but also a process, in which the base station receives (monitors) the D2D signal, and a process, in which the user equipment UE transmits an uplink signal to a base station eNB in the case of RRC idle or in a case where a connection with the base station eNB is not established.

<Overview of D2D>

First, an overview of D2D specified in LTE is described. In addition, also in V2X, it is possible to use the technology of D2D described herein, and the user equipment UE according to the embodiment of the invention can transmit and receive the D2D signal using the technology.

Figure 1:
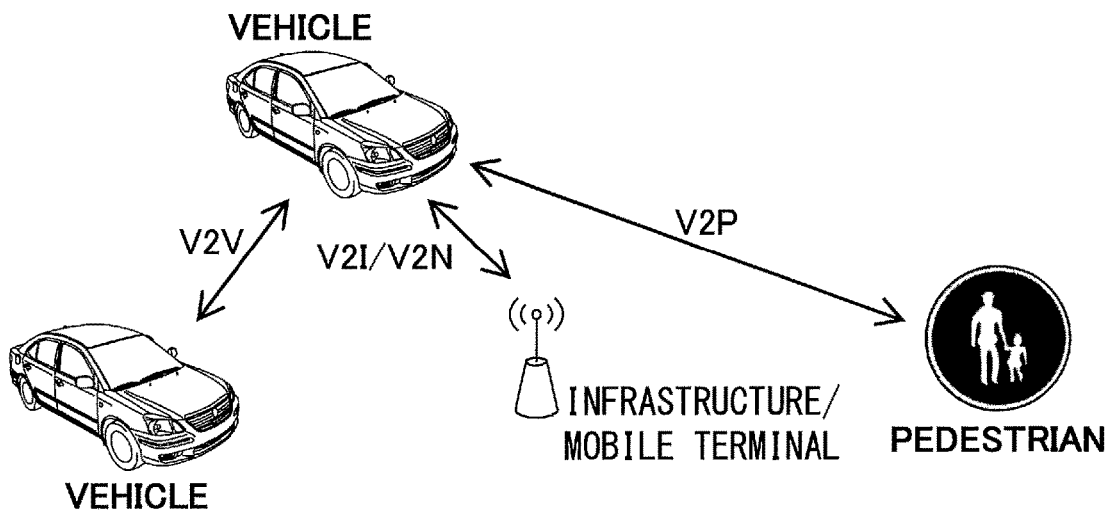
FIG. 1 is a diagram illustrating V2X.
Figure 2A:
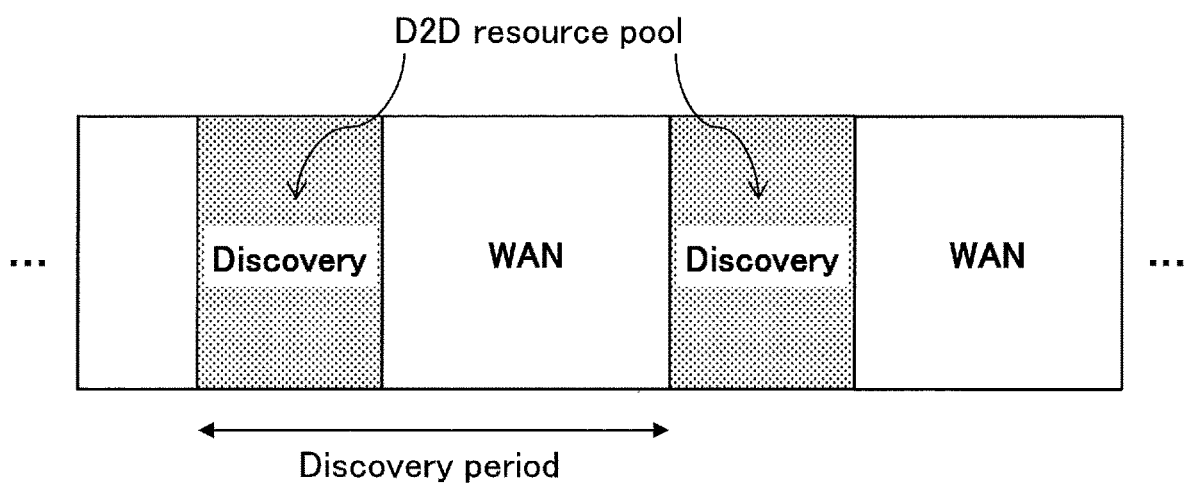
FIG. 2A is a diagram illustrating D2D.
Figure 2B:
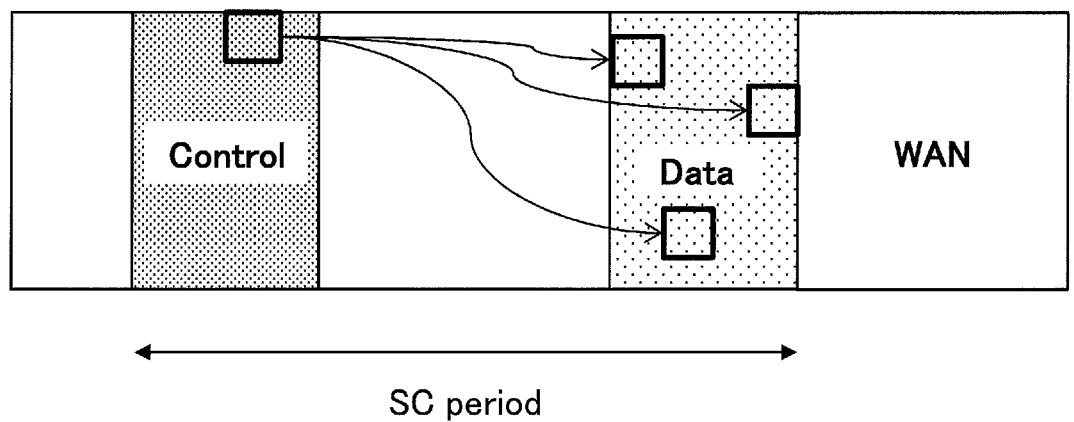
FIG. 2B is a diagram illustrating D2D.

As already described, D2D is roughly divided into "D2D discovery" and "D2D communication". For "D2D discovery", as shown in FIG. 2(*a*), for each Discovery period (also referred to as Physical Sidelink Discovery Channel (PS-DCH) period), a resource pool for a discovery message is secured, and the user equipment UE transmits a discovery message (discovery signal) in the resource pool. More specifically, there are Type 1 and Type 2b. In Type 1, the user equipment UE autonomously selects a transmission resource from the resource pool. In Type 2b, quasi-static resources can be allocated by upper layer signaling (for example, RRC signal).

Also for "D2D communication", as shown in FIG. 28, a resource pool for Sidelink Control Information (SCI)/data transmission is periodically secured. The user equipment UE on the transmission side notifies the reception side of resources for data transmission (Physical Sidelink Control Channel (PSSCH) resource pool) or the like by the SCI with a resource selected from the Control resource pool (Physical Sidelink Control Channel (PSCCH) resource pool), and transmits data with the resources for data transmission. For more details on "D2D communication", there are Mode 1 and Mode 2. In Mode 1, resources are dynamically allocated by (Enhanced) Physical Downlink Control Channel ((E)PDCCH) transmitted to the user equipment UE from the base station eNB. In Mode 2, the user equipment UE autonomously selects a transmission resource from the resource pool. A resource pool is notified by System Information Block (SIB), or a resource pool defined in advance is used.

In LTE, a channel used in "D2D discovery" is referred to as a PSDCH, a channel for transmitting control information, such as SCI, in "D2D communication" is referred to as a Physical Sidelink Shared Channel (PSCCH), and a channel for transmitting data is referred to as a PSSCH.

Figure 3:
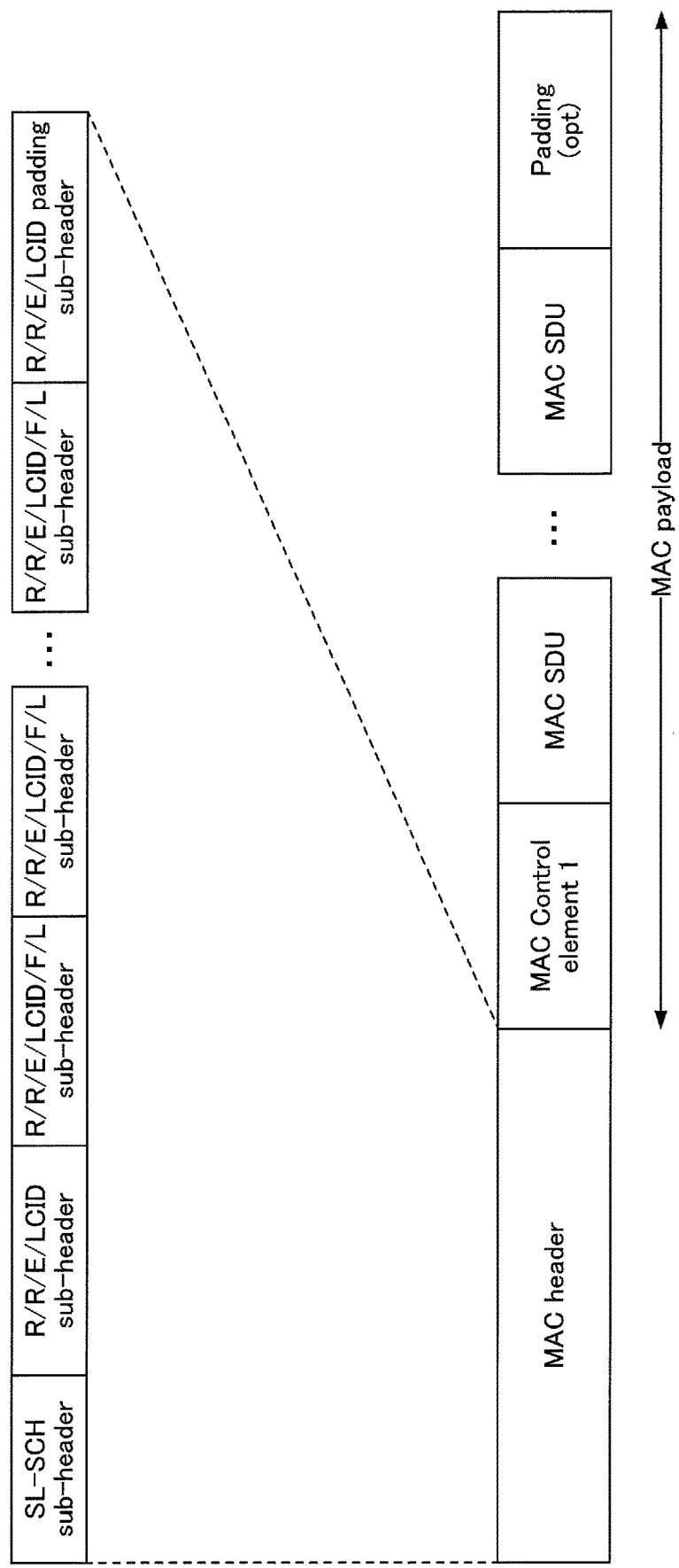
FIG. 3 is a diagram illustrating MAC PDU used in D2D communication.

As shown in FIG. 3, a Medium Access Control (MAC) Protocol Data Unit (PDU) used in D2D communication is configured to include at least MAC header, MAC Control element, MAC Service Data Unit (SDU), and Padding. The MAC PDU may also include other pieces of information. The MAC header includes one Sidelink Shared Channel (SL-SCH) subheader and one or more MAC PDU subheaders.

Figure 4:
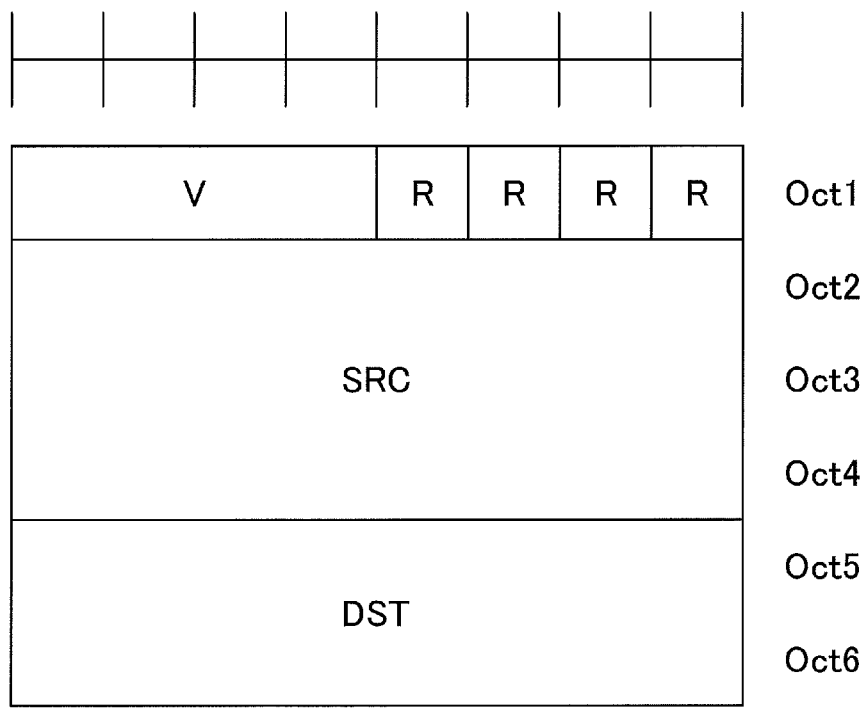
FIG. 4 is a diagram illustrating a format of SL-SCH subheader.

As shown in FIG. 4, the SL-SCH subheader includes MAC PDU format version (V), transmission source information (SRC), transmission destination information (DST), Reserved bit (R), etc. V is allocated to the head of the SL-SCH subheader, and indicates a MAC PDU format version used by the user equipment UE. Information regarding the transmission source is configured in the transmission source information. An identifier for ProSe UE ID may be configured in the transmission source information. Information regarding the transmission destination is configured in the transmission destination information. Information regarding ProSe Layer-2 Group ID of the transmission destination may be configured in the transmission destination information.

Figure 5:
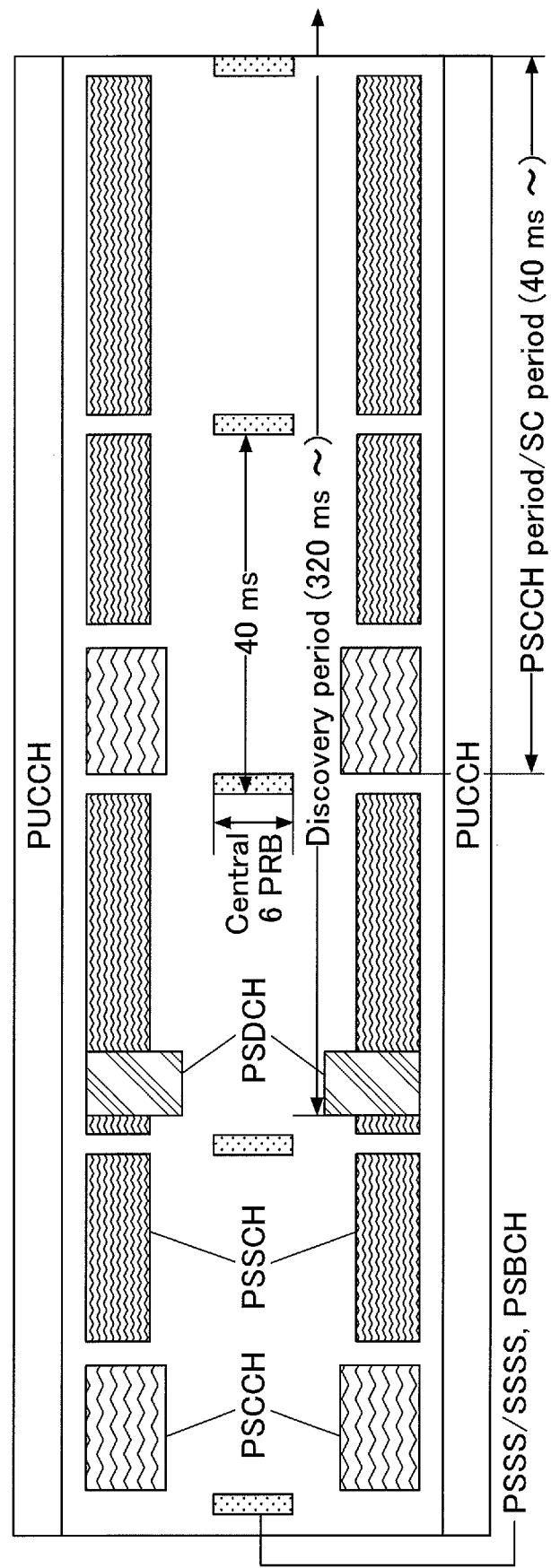
FIG. 5 is a diagram illustrating an example of a channel structure used in D2D.

FIG. 5 shows an example of the channel structure of D2D. As shown in FIG. 5, a resource pool of PSCCH and a resource pool of PSSCH that are used in "D2D communication" are allocated. In addition, a resource pool of PSDCH used in "D2D discovery" is allocated at a period longer than the period of the channel of "D2D communication".

In addition, a Primary Sidelink Synchronization signal (PSSS) and a Secondary Sidelink Synchronization signal (SSSS) are used as synchronization signals for D2D. In addition, a Physical Sidelink Broadcast Channel (PSBCH) for transmitting broadcast information on a system band of D2D, a frame number, resource configuration information, etc., is used, for example, for operation outside coverage.

Figure 6A:
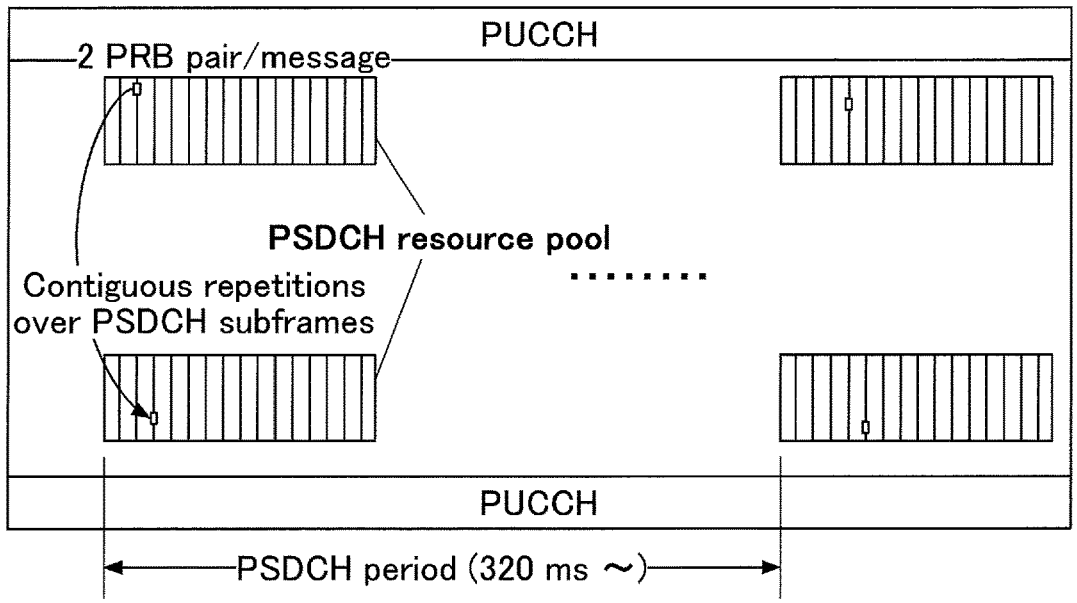
FIG. 6A is a diagram illustrating an example of a structure of PSDCH.
Figure 6B:
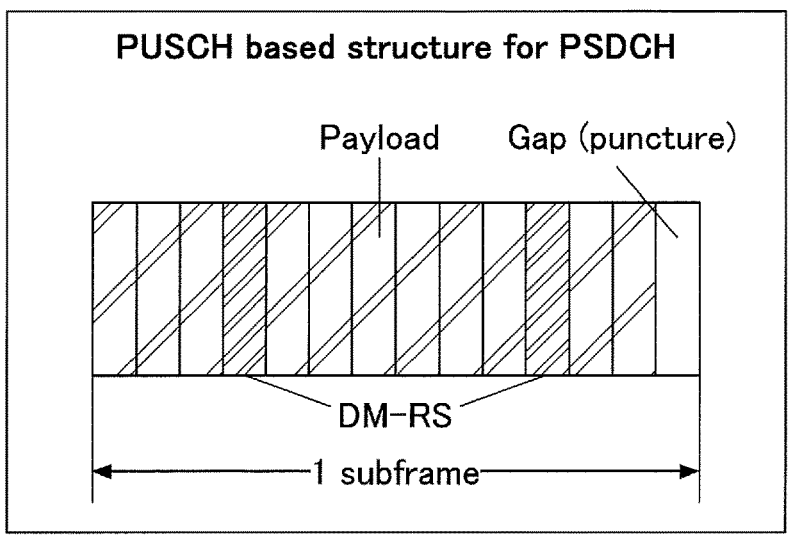
FIG. 6B is a diagram illustrating an example of a structure of PSUCH.

FIG. 6A shows an example of a resource pool of PSDCH used in "D2D discovery". Since the resource pool is configured by the bitmap of the subframe, the resource pool becomes a resource pool of an image shown in FIG. 6A. This is the same for the resource pools of other channels. In addition, PSDCH is repeatedly transmitted (repetition) while performing frequency hopping. The number of repetitions can be set to, for example, 0 to 3. In addition, as shown in FIG. 6B, PSDCH has a PUSCH based structure, and has a structure in which demodulation reference signal (DM-RS) is inserted.

Figure 7A:
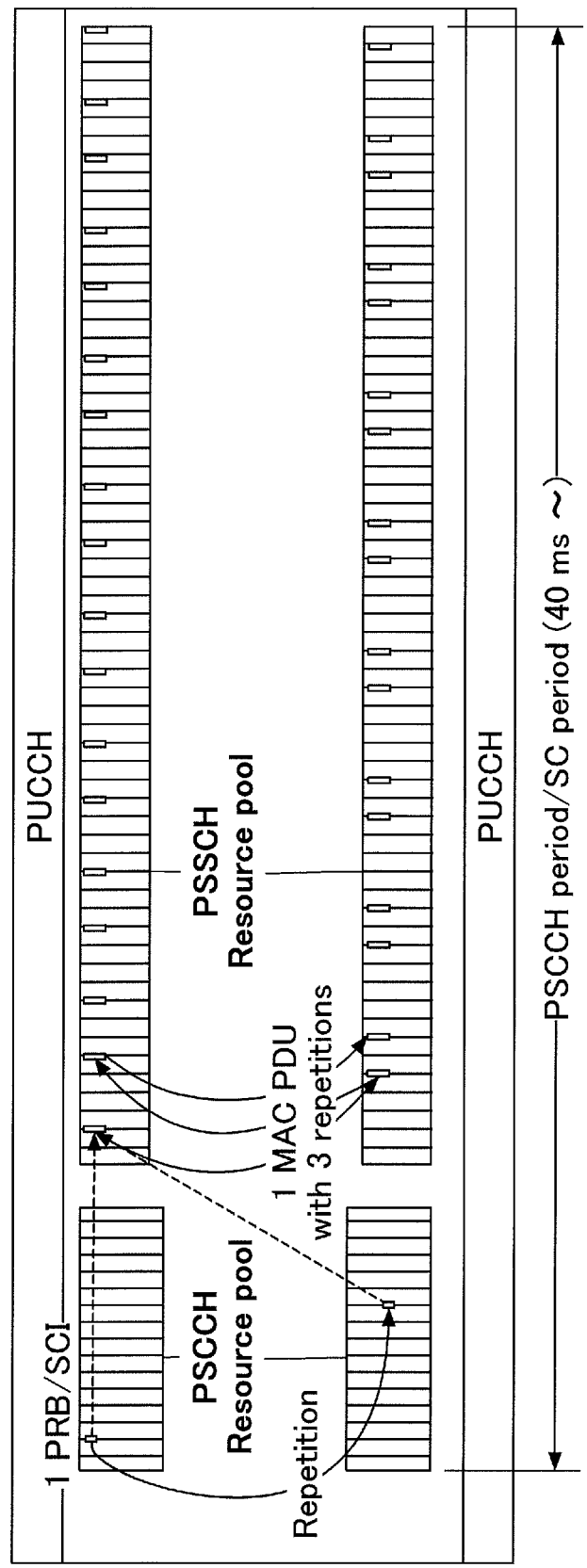
FIG. 7A is a diagram illustrating an example of structures of PSCCH and PSSCH.
Figure 7B:
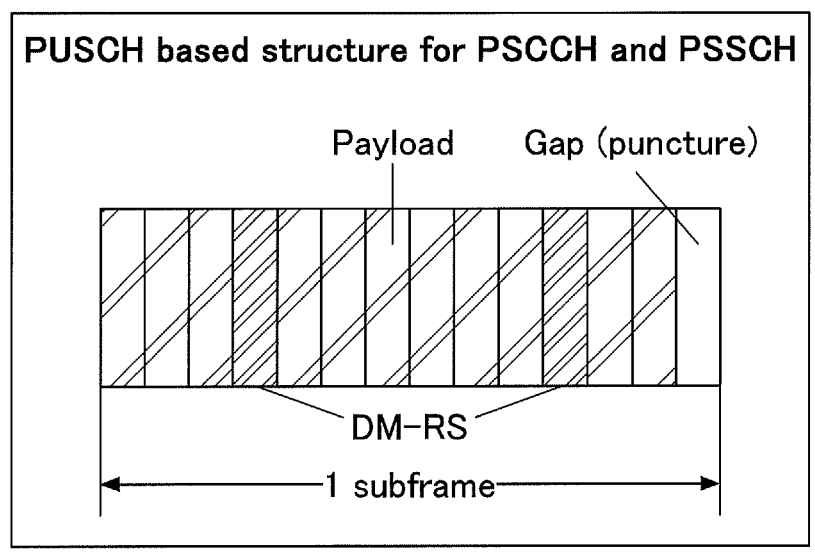
FIG. 7B is a diagram illustrating an example of structures of PSCCH and PSSCH.

FIG. 7A shows examples of resource pools of PSCCH and PSSCH used in "D2D communication". As shown in FIG. 7A, PSCCH is repeatedly transmitted once (repetition) while performing frequency hopping. PSSCH is repeatedly transmitted three times (repetition) while performing frequency hopping. In addition, as shown in FIG. 7B, PSCCH and PSSCH have a PUSCH based structure, and have a structure in which DMRS is inserted.

FIG. 8A shows an example of the resource pool configuration in PSCCH, PSDCH, and PSSCH (Mode 2). As shown in FIG. 8A, in a time direction, the resource pool is represented by a subframe bitmap. In addition, the bitmap is repeated by the number of times of num. repartition. In addition, offset indicating the start position in each period is designated.

Figure 8B:
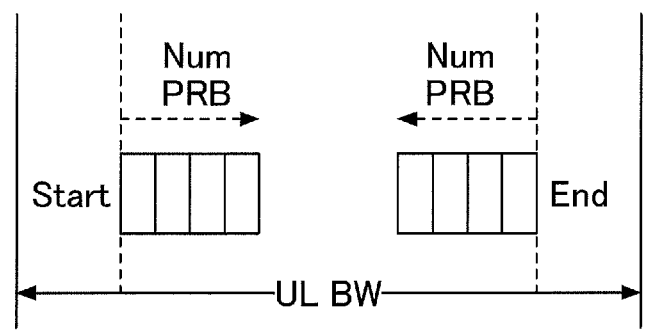
FIG. 8B is a diagram illustrating a resource pool configuration.

In a frequency direction, contiguous allocation and non-contiguous allocation are possible. FIG. 8B shows an example of non-contiguous allocation. As depicted, start PRB, End PRB, and the number of PRBs (numPRB) are designated.

In "D2D Discovery", a periodic gap period called a Discovery gap is defined (Non-Patent Document 3). The discovery gap is a period defined in consideration of a case where a discovery message (discovery signal) needs to be transmitted and received on different carriers from carriers used for UL transmission, and is configured by an explicit request of the user equipment UE. In addition, different periods can be configured for transmission and reception. Within the period of the discovery gap for transmission (Tx), the user equipment UE (in particular, the user equipment UE that does not have the capability to transmit and receive radio signals simultaneously on a plurality of carriers) can transmit the discovery message (discovery signal) by switching the frequency of a transmitter provided in the user equipment UE to the frequency of the carrier on which D2D discovery is performed. Similarly, within the period of the discovery gap for reception (Rx), the user equipment UE can monitor (await) the discovery message (discovery signal) by switching the frequency of a receiver provided in the user equipment UE to the frequency of the carrier on which D2D discovery is performed. In addition, in the period of the discovery gap for transmission, the base station eNB performs scheduling so that UL communication is not performed during the period of the discovery gap for transmission. In the period of the discovery gap for reception, the base station eNB performs scheduling so that DL communication is not performed during the period of the discovery gap.

Figure 9:
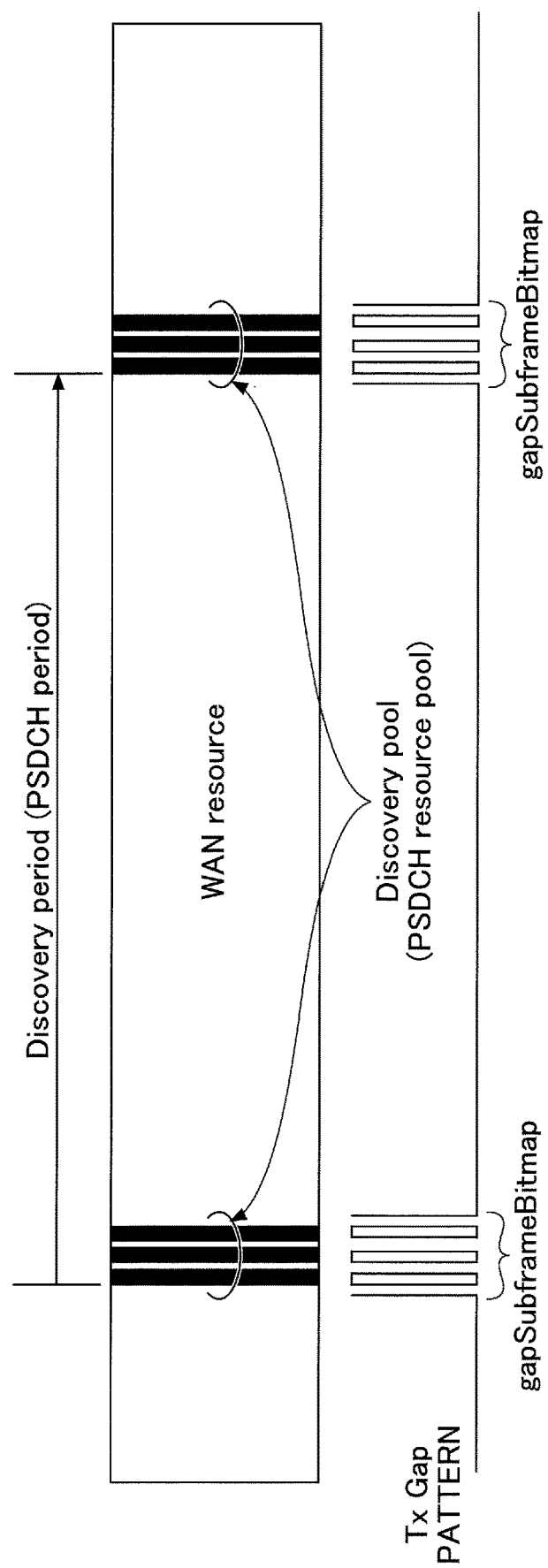
FIG. 9 is a diagram illustrating a setting example of a Tx Gap pattern.

The pattern of the discovery gap (hereinafter, referred to as a "Gap pattern") is determined by the base station eNB based on candidates (SL-Gap Request) for the Tx and/or Rx Gap pattern included in the RRC message (SidelinkUEInformation) from the user equipment UE, and the determined Gap pattern of Tx and/or Rx is configured in the user equipment UE by the information element (SL-GapPattern) included in the RRC message (RRC Connection Reconfiguration). FIG. 9 shows a configuration example of the Tx Gap pattern. In addition, a Wide Area Network (WAN) means cellular, and is an expression mainly used for distinguishing D2D from cellular in 3GPP. In FIG. 9 in particular, the WAN means UL resources among the cellular radio resources.

A subframe corresponding to the discovery gap is expressed by a bitmap (gapSubframeBitmap). In addition, the bitmap is repeated at a period configured by the gap period (gapPeriod). In addition, offset (gapOffset) indicating the start position in each period is designated. FIG. 10 shows the information element.

<System Configuration>

Figure 11:
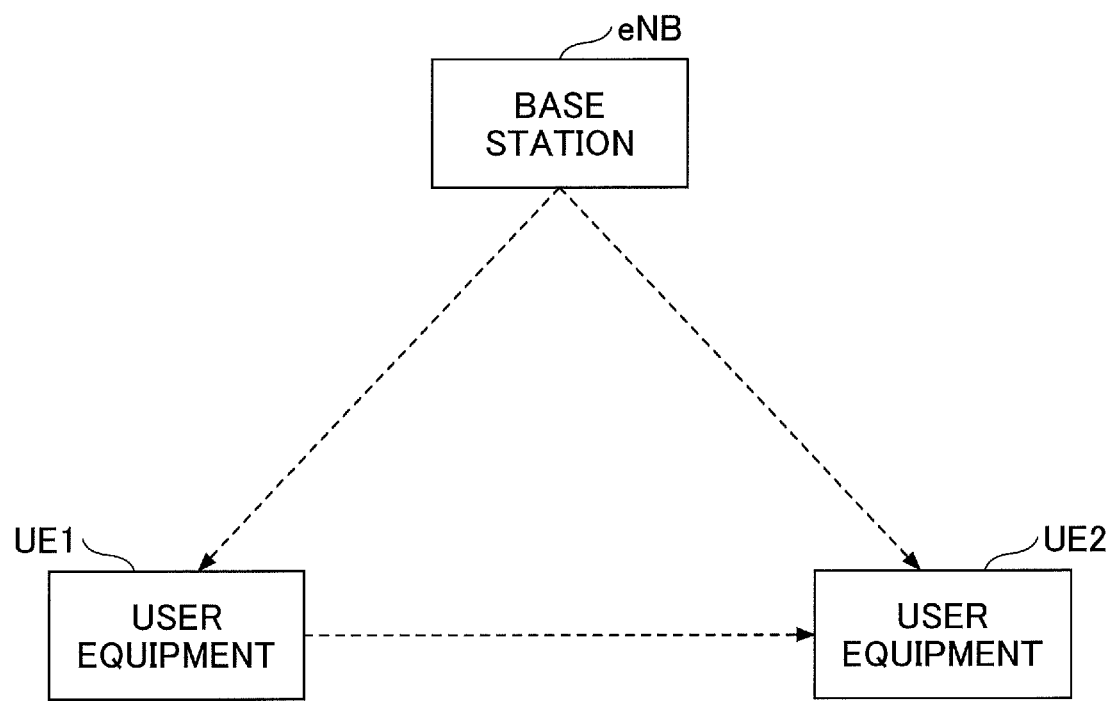
FIG. 11 is a diagram illustrating an example of the configuration of a radio communication system according to an embodiment.

FIG. 11 is a diagram illustrating an example of the configuration of the radio communication system according to the embodiment. As shown in FIG. 11, the radio communication system according to the present embodiment includes the base station eNB; user equipment UE1; and user equipment UE2. In FIG. 11, it is intended that the user equipment UE1 is a transmission side and the user equipment UE2 is a reception side. However, each of the user equipment UE1 and the user equipment UE2 has both a transmission function and a reception function. In the following, if the user equipment UE1 and the user equipment UE2 are not particularly distinguished from each other, the user equipment is simply described as the "user equipment UE."

Each of the user equipment UE1 and the user equipment UE2 shown in FIG. 11 has a function of cellular communication as the user equipment UE in LTE and a D2D function including signal transmission and reception in the above-described channels. In addition, each of the user equipment UE1 and the user equipment UE2 has a function of executing the operation described in the present embodiment. In addition, for the function of cellular communication and the function of the existing D2D, each of the user equipment UE1 and the user equipment UE2 may have only some of the functions (range in which the operation described in the present embodiment can be executed), or may have all the functions.

In addition, although each user equipment UE may be any device with the function of D2D, each user equipment US is, for example, a vehicle, a terminal held by a pedestrian, or an RSU (UE type RSU having a UE function). The user equipment UE according to the present embodiment may be the user equipment UE capable of transmitting and receiving signals only at one frequency (one carrier), or may be the user equipment UE capable of transmitting and receiving signals simultaneously at a plurality of frequencies (a plurality of carriers).

In addition, the base station eNB includes a cellular communication function as a base station eNB in LTE; and a function (a resource allocation function, a reporting function, etc.) for enabling communication of the user equipment UE according to the embodiment. In addition, the base station eNB includes an RSU (an eNB type RSU with an eNB function).

"V2X data" used in the following description may be V2V data, may be V2I data, may be V2N data, or may be V2P data. In addition, "data" includes a packet, an MAC Protocol Data Unit (PDU), or a Transport Block (TB) unless otherwise noted. In addition, although the explanation is given on the assumption that the "D2D signal" is a signal of D2D communication (may be SCI, or may be data, or may be a combination of SCI and data), the "D2D signal" may be a message (discovery signal) of D2D discovery without being limited thereto. In addition, "resource" includes a time resource (for example, a subframe) or a time and frequency resource unless otherwise noted.

In addition, although the following explanation is given on the assumption that the user equipment UE transmits and receives the D2D signal including V2X data, data included in the D2D signal is not necessarily limited to the V2X data. The present embodiment can also be applied to a case of transmitting and receiving a D2D signal including arbitrary data other than the V2X data.

<Overview>

In the present embodiment, the user equipment UE can transmit the data of V2X preferentially, when necessary, by using a "transmission method (transmission method 1) of D2D signal including V2X data" or a "transmission method (transmission method 2) of D2D signal including V2X data" to be described below. In addition, the base station eNB and the user equipment UE may support both the "transmission method (transmission method 1) of D2D signal including V2X data" and the "transmission method (transmission method 2) of D2D signal including V2X data", or may support only one of the transmission methods.

<Transmission Method of D2D Signal Including V2X Data (Transmission Method 1)>

Subsequently, a transmission method (transmission method 1) when the user equipment UE transmits the D2D signal including the V2X data is described. In the transmission method (transmission method 1), the user equipment UE transmits the D2D signal including the V2X data in the period of a discovery gap (hereinafter, referred to as a "Gap period") using the structure of the discovery gap described above. The discovery gap in the conventional D2D is a period defined in consideration of a case where it is necessary to transmit and receive a message (discovery signal) of D2D discovery on a carrier different from the UL carrier, and the base station eNB performs scheduling so that UL communication is not performed during the period. That is, the period can be said to be a period in which the transmission and reception of the message of the D2D signal is prioritized over the UL communication. Therefore, in the transmission method (transmission method 1) of the D2D signal including the V2X data, the user equipment UE can preferentially transmit the D2D signal including V2X by transmitting the D2D signal including the V2X data in the Gap period.

Figure 12:
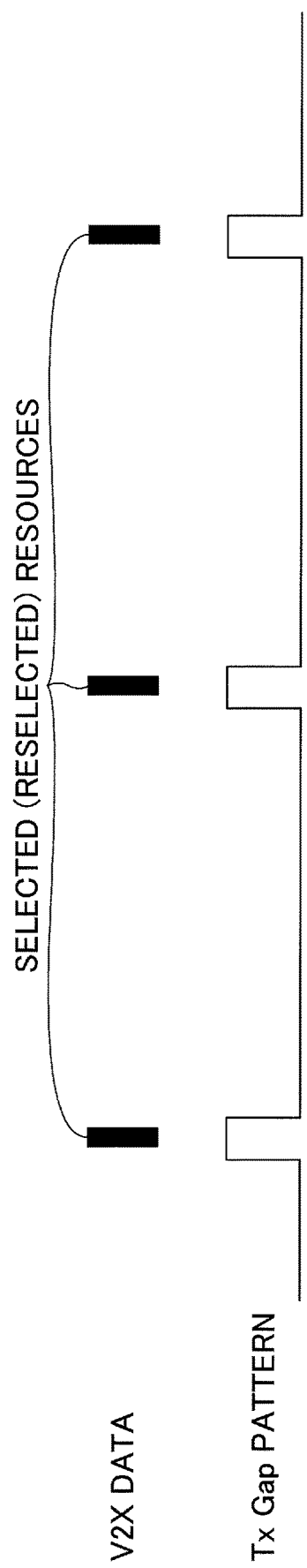
FIG. 12 is a diagram illustrating a transmission method (transmission method 1) of a D2D signal including V2X data.

FIG. 12 is a diagram illustrating the transmission method (transmission method 1) of the D2D signal including the V2X data. A Tx Gap pattern (Gap pattern for transmission) including a resource for transmitting the D2D signal including the V2X data is shared by the user equipment UE and the base station eNB, and the user equipment UE transmits the D2D signal including the V2X data in the Gap period indicated by the Tx Gap pattern. In addition, the transmission method (transmission method 1) can be applied to both a case where the transmission of the D2D signal including the V2X data is performed on the same carrier (intra-Carrier) as for the UL communication and a case where the transmission of the D2D signal including the V2X data is performed on a different carrier (inter-Carrier) from that for the UL communication. Accordingly, the Gap period indicated by the Gap pattern may include not only a period for transmitting the D2D signal including the V2X data but also a period in which the user equipment UE performs switching (tuning and re-tuning) of the frequency of the transmitter and synchronization with the carrier of the switching destination (for example, a subframe for transmitting the D2D signal and several subframes before and after the subframe).

The user equipment UE and the base station eNB may perform selection of a resource for transmitting the D2D signal including the V2X data and determination of a Gap pattern using any of the following methods.

(Transmission Method (transmission Method 1-1))

In the transmission method (transmission method 1-1), the user equipment UE selects a resource for transmitting the D2D signal, and the base station eNB determines a Tx Gap pattern to be configured in the user equipment UE.

Figure 13:
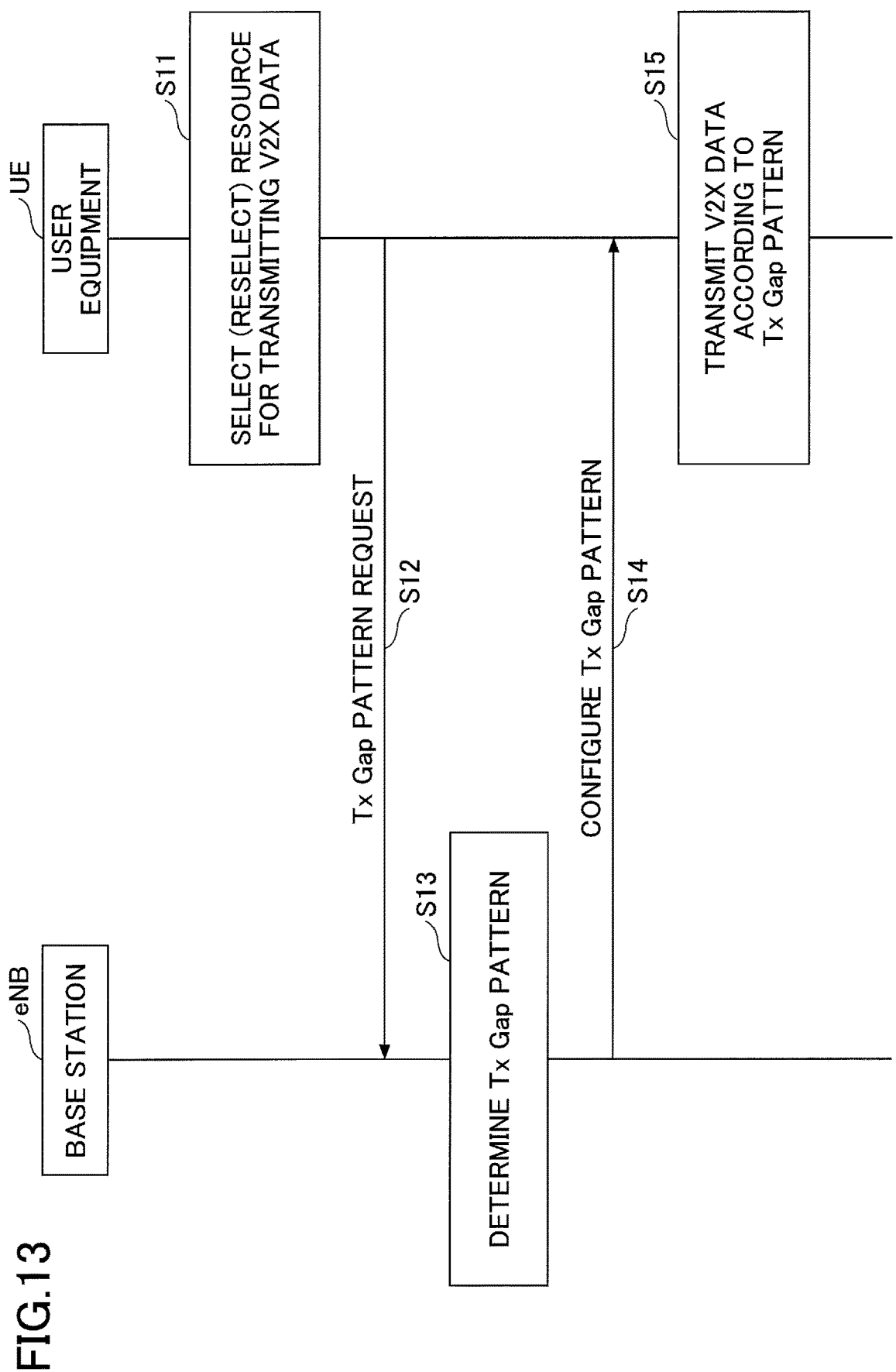
FIG. 13 is a sequence diagram illustrating a transmission method (transmission method 1-1) of a D2D signal including V2X data.

FIG. 13 is a sequence diagram illustrating a transmission method (transmission method 1-1) of the D2D signal including V2X data. First, the user equipment UE selects (including reselection) periodic resources for semi-persistently transmitting the V2X data (S11). In addition, reselecting periodic resources refers to selecting other periodic resources when a problem (for example, collision) occurs in the already selected periodic resources. Then, the user equipment UE transmits a Gap pattern request signal, which is for sending a request for a Gap pattern corresponding to the selected radio resource, to the base station (S12). More specifically, the user equipment UE generates a candidate for a Tx Gap pattern including a resource selected (reselected) during the Gap period, and transmits a Gap pattern request signal to the base station eNB in a state in which the Gap pattern request signal includes the generated candidate for a Tx Gap pattern.

Then, the base station eNB determines a Tx Gap pattern to be configured in the user equipment UE based on the candidate for the Tx Gap pattern that has been received from the user equipment UE, and configures the determined Tx Gap pattern in the user equipment UE (notifies the user equipment UE of the determined Tx Gap pattern) (S13 and S14). The user equipment UE transmits the D2D signal including the V2X data in the Gap period indicated by the configured Tx Gap pattern (S15).

In addition, in V2X, the user equipment UE is mainly located outdoors. Therefore, in 3GPP, in the user equipment UE capable of receiving a signal of a Global Navigation Satellite System (GNSS), a synchronization method for synchronizing with the signal of the GNSS has been studied, instead of a synchronization signal of the base station eNB. Accordingly, in a case where the user equipment UE synchronizes with the signal of the GNSS, when generating a Tx Gap pattern candidate, it is necessary to generate Tx Gap pattern candidates according to the synchronization timing of the base station eNB (that is, such that the base station eNB does not erroneously recognize the time axis of the resource).

[Modification Example of the Transmission Method (Transmission Method 1-1)]

In the process of step S12, the user equipment UE may transmit a Gap pattern request signal to the base station eNB in the RRC message, or may transmit a Gap pattern request signal to the base station eNB using layer 2 signaling (MAC signaling). In the latter case, a new MAC subheader indicating the Gap pattern request signal may be used. Therefore, it is possible to reduce the amount of delay and signaling.

The user equipment UE may transmit a Gap pattern request signal to the base station eNB in a state in which the Gap pattern request signal includes information indicating the priority of V2X data to be transmitted (may be information indicating the type of V2X data) (S12). In this case, the base station eNB may determine a Tx Gap pattern to be configured in the user equipment UE based on the information indicating the priority of the V2X data (S13). For example, in a case where the base station eNB determines that the priority of the V2X data is lower than the priority of UL communication (for example, a voice call or the like), determining a Tx Gap pattern in which a Gap period corresponding to a resource used for the UL communication has been thinned out in a Gap period included in the Tx Gap pattern candidate, as a Tx Gap pattern to be configured in the user equipment UE, can be considered in order to give priority to UL communication. Conversely, in a case where the base station eNB determines that the priority of the V2X data is higher than the priority of UL communication, determining the Tx Gap pattern candidate notified from the user equipment UE as a Tx Gap pattern to be configured in the user equipment UE as it is.

In addition, in a case where V2X is being operated with a plurality of carriers and V2X data is scheduled to be transmitted on each of the plurality of carriers, the user equipment UE may select (reselect) a resource for each carrier in the process of step S11, generate a Tx Gap pattern candidate for each carrier in the process of step S12, and transmit a Gap pattern request signal to the base station eNB in a state in which the Gap pattern request signal includes the generated Tx Gap pattern candidate for each carrier. In this case, the base station eNB may determine a Tx Gap pattern to be configured in the user equipment UE for each carrier (S13), and may set the determined Tx Gap pattern for each carrier in the user equipment UE (notify the user equipment UE of the determined Tx Gap pattern for each carrier) (S14).

In addition, in a case where V2X is being operated with a plurality of carriers and V2X data is scheduled to be transmitted on each of the plurality of carriers, the user equipment UE may transmit a Gap pattern request signal to the base station eNB in a state in which the Gap pattern request signal includes not only the generated Tx Gap pattern candidate for each carrier but also information indicating the highest priority in the V2X data scheduled to be transmitted on each carrier (S12). For example, in a case where V2X data of priority "1" and V2X data of priority "2" are scheduled to be transmitted on a carrier A and V2X data of priority "3" is scheduled to be transmitted on a carrier B, the user equipment UE may transmit a Gap pattern request signal to the base station eNB in a state in which the Gap pattern request signal includes information indicating that the V2X data of priority "1" is scheduled to be transmitted for the carrier A and the V2X data of priority "3" is scheduled to be transmitted for the carrier B. In this case, the base station eNB may determine a Tx Gap pattern to be configured in the user equipment UE for each carrier based on the priority of each carrier (S13), and may set the determined Tx Gap pattern for each carrier in the user equipment UE (notify the user equipment UE of the determined Tx Gap pattern for each carrier) (S14).

(Transmission method (transmission method 1-2))

In a transmission method (transmission method 1-2), the base station eNB sets the priority between V2X communication and UL communication in the user equipment UE in advance. In a case where V2X data is scheduled to be transmitted and the priority of V2X communication is higher than the priority of UL communication, the user equipment UE selects (reselects) a resource for transmitting the D2D signal including the V2X data, and determines a Tx Gap pattern by itself. In addition, the base station eNB receives a report of the resource selected (reselected) in the user equipment UE, recognizes the Tx Gap pattern based on the reported resource, and performs scheduling based on the recognized Tx Gap pattern.

Figure 14:
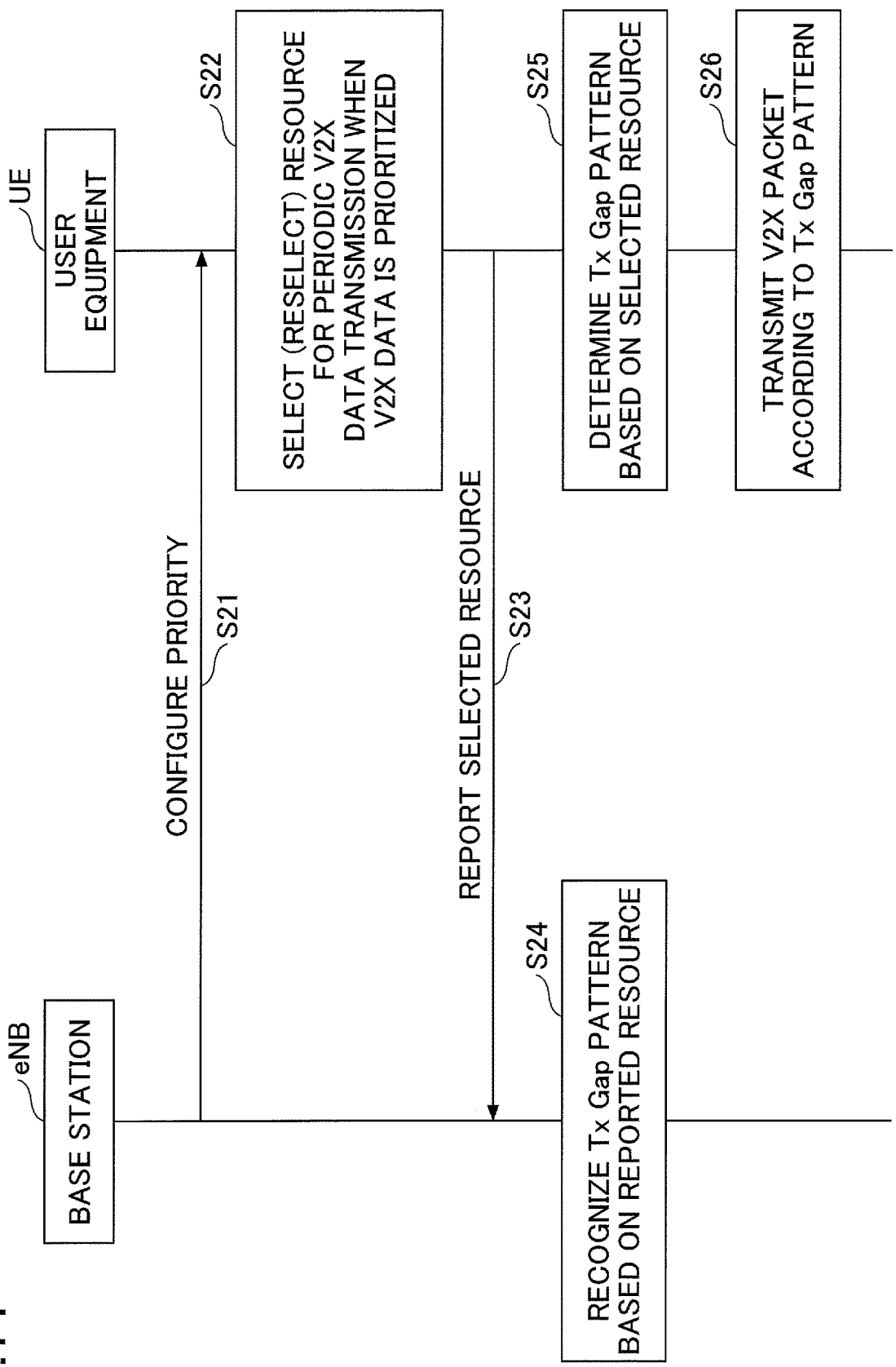
FIG. 14 is a sequence diagram illustrating a transmission method (transmission method 1-2) of a D2D signal including V2X data.

FIG. 14 is a sequence diagram illustrating a transmission method (transmission method 1-2) of the D2D signal including V2X data. First, the base station eNB sets the priority between V2X communication and UL communication in the user equipment UE (S21). The base station eNB may set the priority in the user equipment UE using broadcast information (SIB), or may individually set the priority in the user equipment UE using the RRC message. Then, in a case where V2X data is scheduled to be transmitted and the priority of the V2X data to be transmitted is higher than the priority of UL communication, the user equipment UE selects (reselects) periodic resources for transmitting the V2X data semi-persistently (S22). In addition, in a case where V2X data is scheduled to be transmitted but the priority of the V2X data to be transmitted is lower than the priority of UL communication, the user equipment UE may request the base station eNB to set a Tx Gap pattern using, for example, a method described in the aforementioned transmission method (transmission method 1-1) instead of selecting periodic resources by itself (may leave the setting of the Tx Gap pattern to the base station eNB).

Then, the user equipment UE reports information indicating the selected (reselected) periodic resources to the base station eNB (S23). In addition, the information indicating the selected (reselected) periodic resources includes, for example, information of the time domain (for example, information indicating the position of a periodic subframe), a reservation period (for example, information indicating that resources have been reserved up to 10 seconds later), and the like.

Then, the base station eNB implicitly recognizes a Tx Gap pattern based on the reported periodic resources (S24). Then, the user equipment UE determines the Tx Gap pattern by itself based on the selected (reselected) periodic resources (S25). In addition, the Tx Gap pattern that the base station eNB recognizes in step S24 and the Tx Gap pattern that the user equipment UE determines in step S25 may be the same. That is, the base station eNB and the user equipment UE may recognize (determine) the Tx Gap pattern using the same rule (for example, a rule in which a subframe for transmitting the D2D signal and several subframes before and after the subframe are set as a Gap period). Then, the user equipment UE transmits the D2D signal including the V2X data in the Gap period indicated by the set Tx Gap pattern (S26).

In addition, in a case where the user equipment UE synchronizes with the signal of the GNSS, when reporting the selected (reselected) periodic resources to the base station eNB, it is necessary to report the selected (reselected) periodic resources according to the synchronization timing of the base station eNB (that is, such that the base station eNB does not erroneously recognize the time axis of the resource).

[Modification Example of the Transmission Method (Transmission Method 1-2)]

In the process of step S23, the user equipment UE may transmit information indicating the selected (reselected) periodic resources to the base station eNB using layer 2 signaling (MAC signaling). In the latter case, a new MAC subheader indicating the selected (reselected) periodic resources may be used. Therefore, it is possible to reduce the amount of delay and signaling.

(Transmission Method (Transmission Method 1-3))

Next, a transmission method (transmission method 1-3) is described. In the transmission method (transmission method 1-3), the user equipment UE allocates a resource required for the user equipment UE to transmit the D2D signal, and notifies the user equipment UE of the allocated resource. In addition, the base station eNB determines a Tx Gap pattern based on the allocated resource, and performs scheduling based on the determined Tx Gap pattern. In addition, the user equipment US recognizes the Tx Gap pattern based on the allocated resource.

Figure 15:
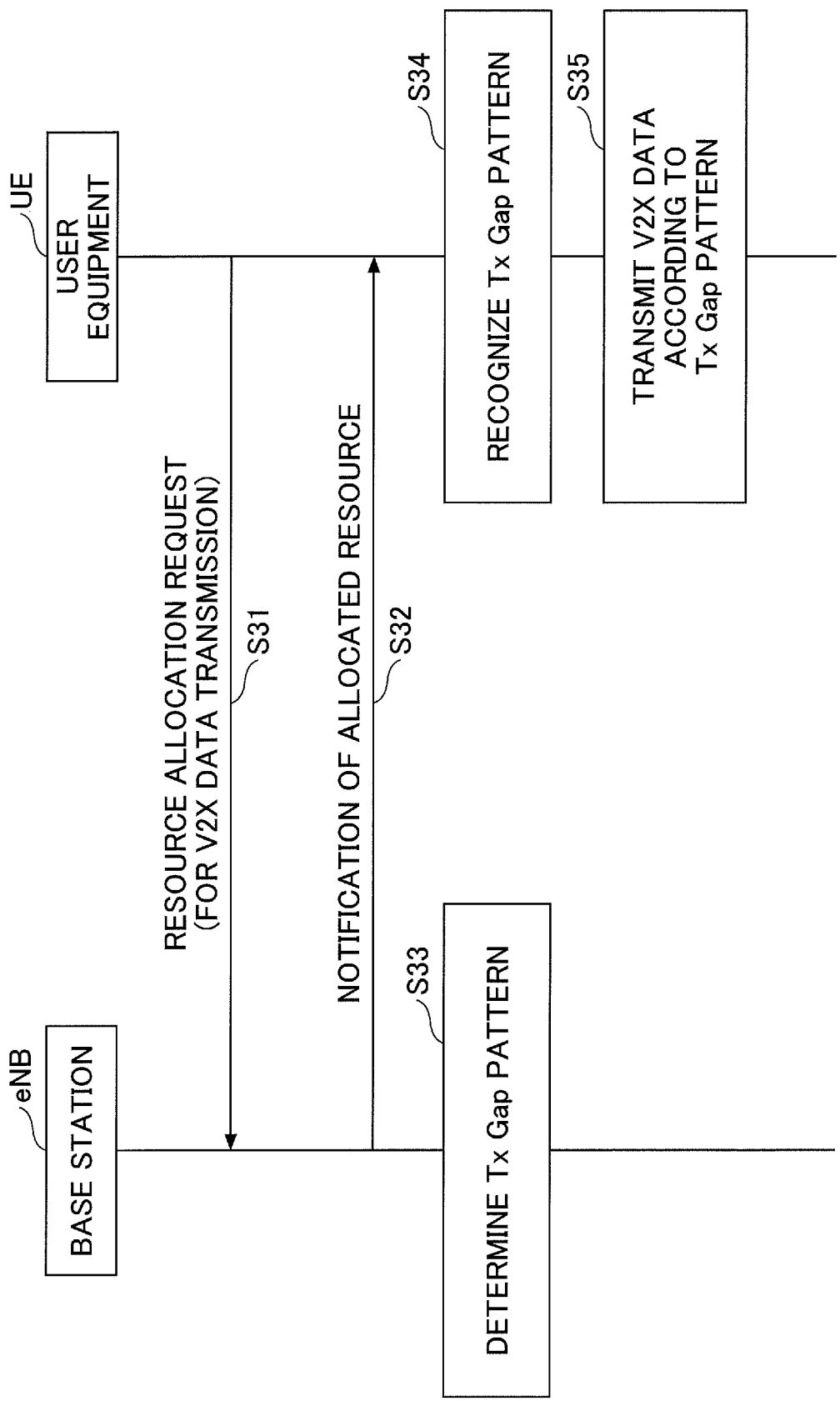
FIG. 15 is a sequence diagram illustrating a transmission method (transmission method 1-3) of a D2D signal including V2X data.

FIG. 15 is a sequence diagram illustrating a transmission method (transmission method 1-3) of the D2D signal including V2X data. The user equipment UE requests the base station eNB to allocate periodic resources for semi-persistently transmitting the V2X data (S31). Then, based on the priority between V2X communication and UL communication, the base station eNB allocates a resource allowing semi-persistent transmission of V2X data to the user equipment UE, and notifies the user equipment UE of the allocated periodic resources (S32). In addition, depending on the priority between V2X communication and UL communication, the base station eNB may not allow semi-persistent transmission of V2X data to the user equipment UE (that is, may allocate no resources).

Then, the base station eNB determines a Tx Gap pattern based on the allocated periodic resources (S33). Then, the user equipment UE implicitly recognizes the Tx Gap pattern based on the notified periodic resources (S34). In addition, the Tx Gap pattern that the base station eNB determines in step S33 and the Tx Gap pattern that the user equipment UE recognizes in step S34 may be the same. That is, the base station eNB and the user equipment UE may recognize (determine) the Tx Gap pattern using the same rule (for example, a rule in which a subframe for transmitting the D2D signal and several subframes before and after the subframe are set as a Gap period). Then, the user equipment UE transmits the D2D signal including the V2X data in the Gap period indicated by the set Tx Gap pattern (S35).

In addition, in the process of step S32, when notifying the user equipment UE of the allocated periodic resource, the base station eNB may explicitly notify the user equipment UE of the Tx Gap pattern. In this case, the process of step S34 can be omitted.

(Supplementary Matters Regarding the Transmission Method (Transmission Method 1))

Instead of requesting the setting of a transmission gap (or reporting the selected resource) for the resource to be transmitted as described above, in a case where a transmission gap is already configured in the user equipment UE, the user equipment UE may select a transmission resource from subframes included in the already set transmission gap. By such an operation, in a case where there is no periodicity in the transmitting resources or the periodicity is small, it becomes easy to dynamically change the transmission resource.

<Transmission Method of D2D Signal Including V2X Data (Transmission Method 2)>

In the transmission method (transmission method 2), the "priority between V2X communication and UL communication" is configured in the user equipment UE. In a case where the TB of V2X data to be transmitted and the TB of the UL to be transmitted conflict with each other, the user equipment UE determines which TB is to be transmitted based on the set priority, and drops (discards) the TB whose priority is determined to be low (or holds the TB whose priority is determined to be low in a buffer until the TB whose priority is determined to be low becomes ready to be transmitted).

Unlike in the transmission method (transmission method 1), no Tx Gap pattern is used in the transmission method (transmission method 2). Accordingly, unlike in the transmission method (transmission method 1), the base station eNB cannot perform UL scheduling while avoiding the timing of transmitting V2X data by using the Tx Gap pattern. For this reason, there may be a case where the transmission of the V2X data and the transmission of the UL conflict with each other inside the user equipment UE.

Figure 16:
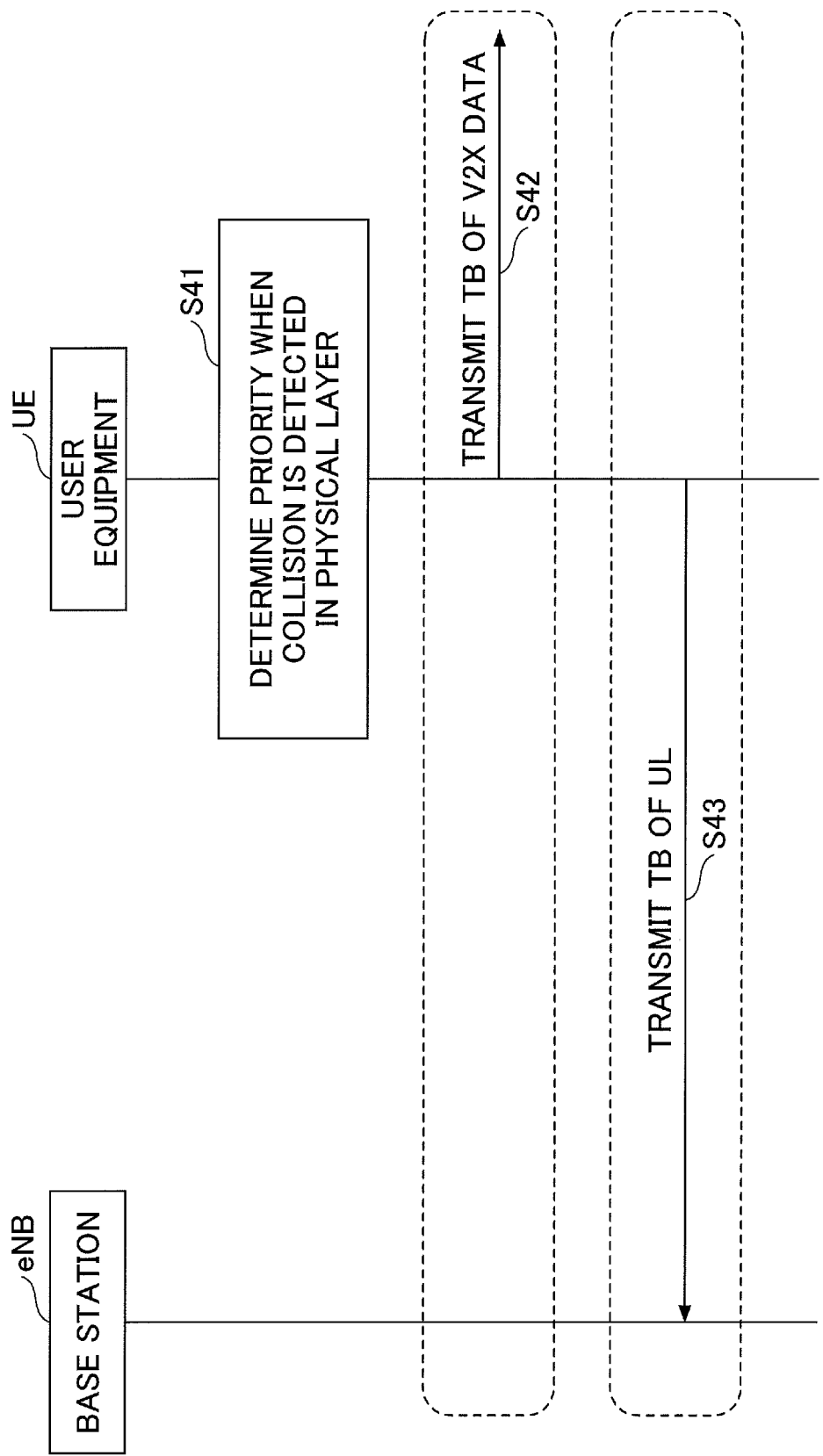
FIG. 16 is a sequence diagram illustrating a transmission method (transmission method 1-2) of a D2D signal including V2X data.

FIG. 16 is a sequence diagram illustrating a transmission method (transmission method 2) of the D2D signal including V2X data. The process of the following steps S41 to S43 is repeatedly executed each time TB transmission from the physical layer is performed.

Figure 17:
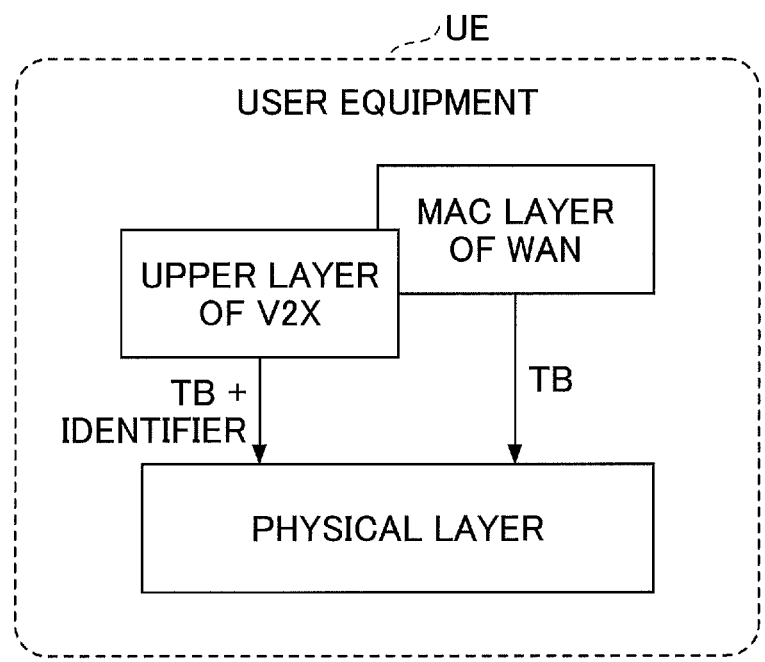
FIG. 17 is a diagram illustrating the operations of an upper layer and a physical layer of user equipment.

First, data is generated in each of an upper layer of V2X (for example, an application of V2X) for generating V2X data and an upper layer (UL application or the like) for generating UL data, and notification of a TB (may be an MAC PDU) corresponding to each piece of the generated data is sent to the physical layer. Then, in a case where it is detected that the transmission of the TB of the V2X data and the transmission of the TB of the UL conflict with each other (that is, in a case where a conflict occurs inside the user equipment UE), the physical layer determines which TB is to be transmitted (S41). Here, as shown in FIG. 17, the upper layer of V2X determines whether the V2X is to be prioritized or the UL is to be prioritized based on the "priority between V2X communication and UL communication" configured in the user equipment UE, and transmits an identifier indicating which of the V2X and the UL is to be prioritized to the physical layer together with the TB. In addition, the physical layer determines which TB is to be transmitted based on the identifier. The identifier may be 1-bit information. More specifically, the case of "1" may mean that the transmission of the TB of V2X is to be prioritized, and the case of "0" may mean that the transmission of the TB of UL is to be prioritized.

Then, the physical layer of the user equipment UE transmits the TB of the D2D signal including the V2X data in a case where the transmission of the TB of the V2X data is prioritized (S42), and transmits the TB of the UL in a case where the transmission of the TB of the UL is prioritized (S43).

Figure 18:
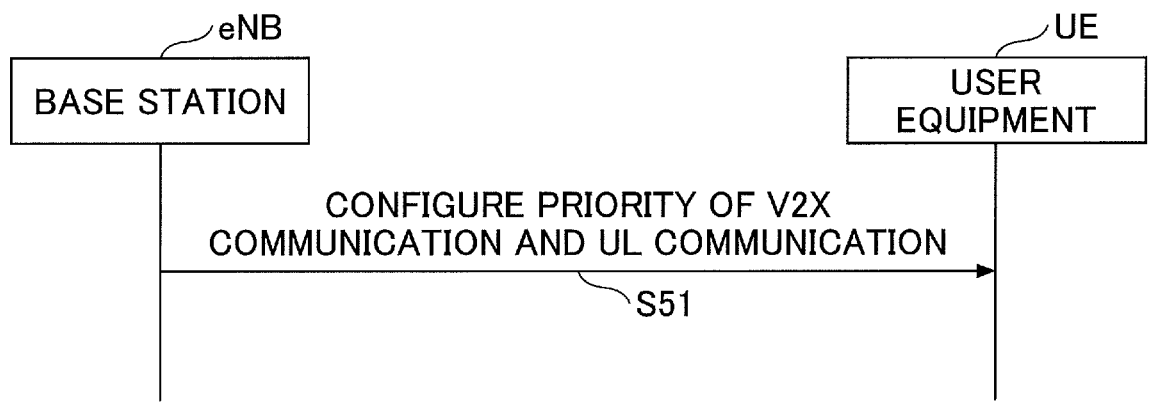
FIG. 18 is a sequence diagram illustrating an example of the process when setting a priority between V2X communication and UL communication.

FIG. 18 is a diagram illustrating a sequence when setting the priority between V2X communication and UL communication in the user equipment. In a case where the user equipment UE autonomously selects (reselects) periodic resources for transmitting V2X data semi-persistently, the base station eNB may set the priority in the user equipment UE using broadcast information, or may set the priority in the user equipment UE using the RRC message (S51). In addition, without being limited to this, the priority may be preconfigured in the user equipment UE through a SIM, a core network, or the like, or may be fixedly set by standard specifications or the like. On the other hand, in a case where the base station eNB allocates periodic resources required for the user equipment UE to transmit V2X data semi-persistently, the base station eNB may set the "priority between V2X communication and UL communication" in the user equipment UE when notifying the user equipment UE of the allocated resource (S51).

The "priority between V2X communication and UL communication" configured in the user equipment UE may be two choices information indicating whether V2X is prioritized or UL is prioritized, or may be information in which the ranking of priorities is specified in detail. In the latter case, for example, the "priority between V2X communication and UL communication" configured in the user equipment UE may be information in which the ranking of priorities is specified between the classes (for example, WAN traffic class 1, WAN traffic class 2, and the like) of a plurality of ULs distinguished by the Quality Class Identifier (QCI) or the logical channel ID of a bearer and a plurality of classes (for example, V2X traffic class 1, V2X traffic class 2, and the like) distinguished by the type of V2X data. In addition, the base station eNB may set an index indicating any one of a plurality of predetermined setting patterns in the user equipment UE. For example, any one setting pattern among setting patterns specified in advance, such as "setting pattern 1: WAN traffic class 1<V2X traffic class 1<WAN traffic class 2 . . . " and "setting pattern 2: V2X traffic class 1<V2X traffic class 2>WAN traffic class 1 . . . ", may be designated. Therefore, it is possible to reduce the amount of information when the base station eNB sets priorities in the user equipment UE.

<Regarding Sensing Using a Receiving Gap>

Until now, the method of transmitting the D2D signal including the V2X data has been described. In the present embodiment, however, the user equipment UE may perform sensing when selecting (reselecting) periodic resources for transmitting V2X data semi-persistently within a gap period indicated by an Rx Gap pattern. In addition, "Sensing" refers to determining the occupancy status and the unused status of resources using a method of measuring received power (may be referred to as received energy or received intensity), or by receiving the SCI transmitted from other units of user equipment UE, decoding the SCI, and detecting the resource positions of the allocated SCI and data, or by combining these.

Figure 19:
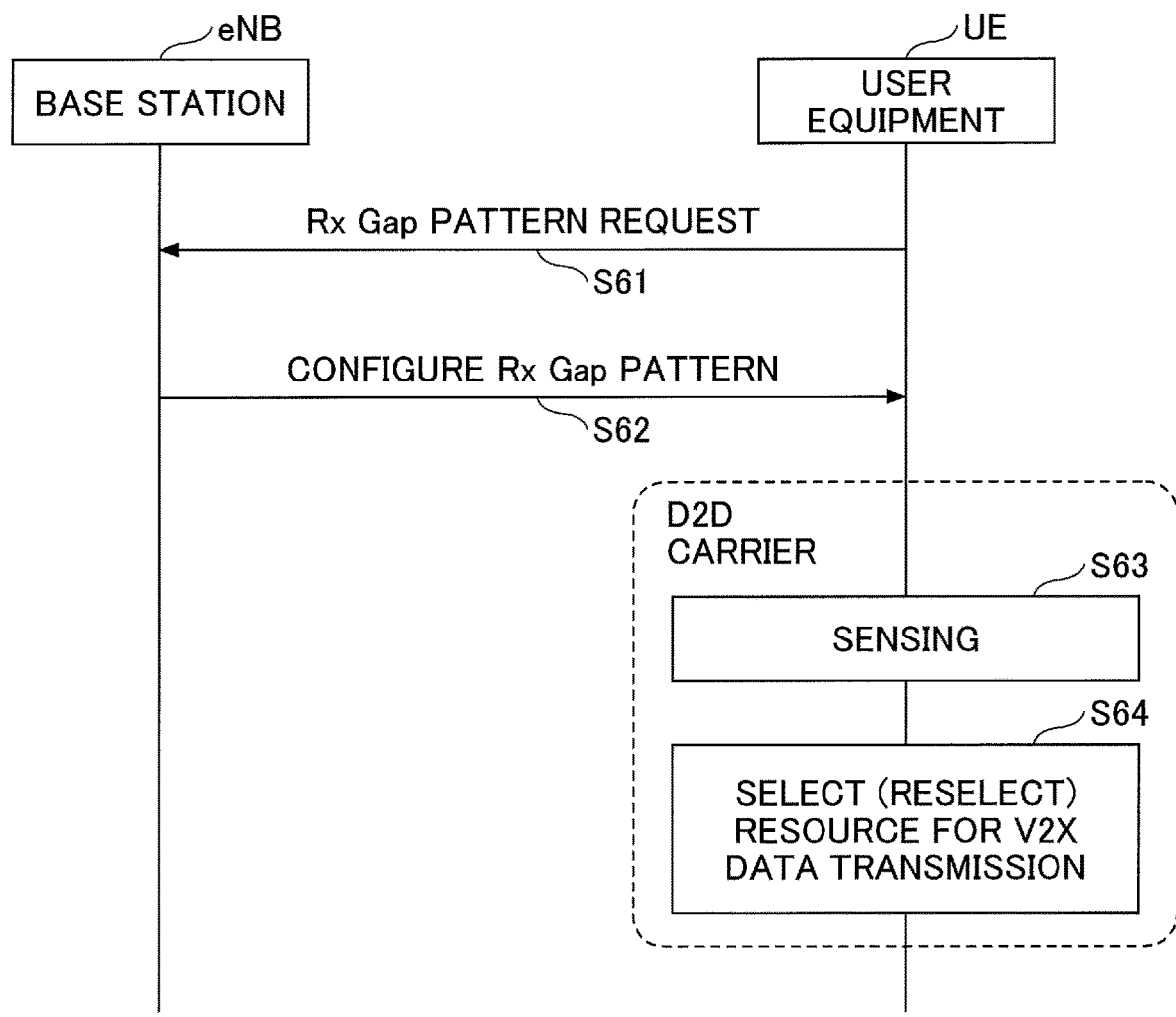
FIG. 19 is a sequence diagram illustrating an example of the process when performing sensing using a receiving gap.

FIG. 19 is a sequence diagram illustrating an example of the process when performing sensing using a receiving gap. First, the user equipment UE requests the base station eNB to determine (set) an Rx Gap pattern (S61). Then, the base station eNB sets the determined Rx Gap pattern in the user equipment UE using the RRC message (S62).

Then, by performing sensing in a Gap period indicated by the set Rx Gap pattern, the user equipment UE checks the unused status of resources in the Gap period (or a period excluding the time required for frequency switching or the like from the Gap period) (S63). Among resources determined to be unused, periodic resources for transmitting V2X data semi-persistently is selected (reselected) (S64). In addition, the process of steps S63 and S64 is an operation performed on a carrier used for transmission and reception of the D2D signal including V2X data. That is, the process of steps S63 and S64 is performed on the UL carrier in a case where the V2X data is transmitted on the same carrier (intra-Carrier) as in the UL communication, and the process of steps S63 and S64 is performed on a carrier different from the UL carrier in a case where the V2X data is transmitted on a carrier (inter-Carrier) different from that in the UL communication.

In addition, when requesting the base station eNB to set an Rx Gap pattern in the process of step S61, the user equipment UE may notify the base station eNB of "information indicating that the setting of the Rx Gap pattern is requested in order to perform sensing". The "information indicating that the setting of the Rx Gap pattern is requested in order to perform sensing" may be included in a message used for the Rx Gap pattern request, or may be included in other signaling messages different from the message used for the Rx Gap pattern request. In addition, when sending notification of the Rx Gap pattern (S62), the base station eNB may notify the user equipment UE that sensing is allowed only in the Gap period indicated by the Rx Gap pattern, or may notify the user equipment UE of a subframe, which allows that sensing is performed independently of the Gap period, together with the Gap period.

In addition, in a case where sensing is required for selection (reselection) of resources, the capability of the receiver of the user equipment UE itself is insufficient (that is, the user equipment UE does not have the capability to simultaneously perform sensing and DL reception), and it is determined that an Rx Gap pattern that can be used for sensing is not set, the user equipment UE may request the base station eNB to set the Rx Gap pattern in the process of step S61.

<Functional Configuration>

Functional configuration examples of the user equipment US and the base station eNB that perform the operations of the above-described plurality of embodiments are described.

(User Equipment)

Figure 20:
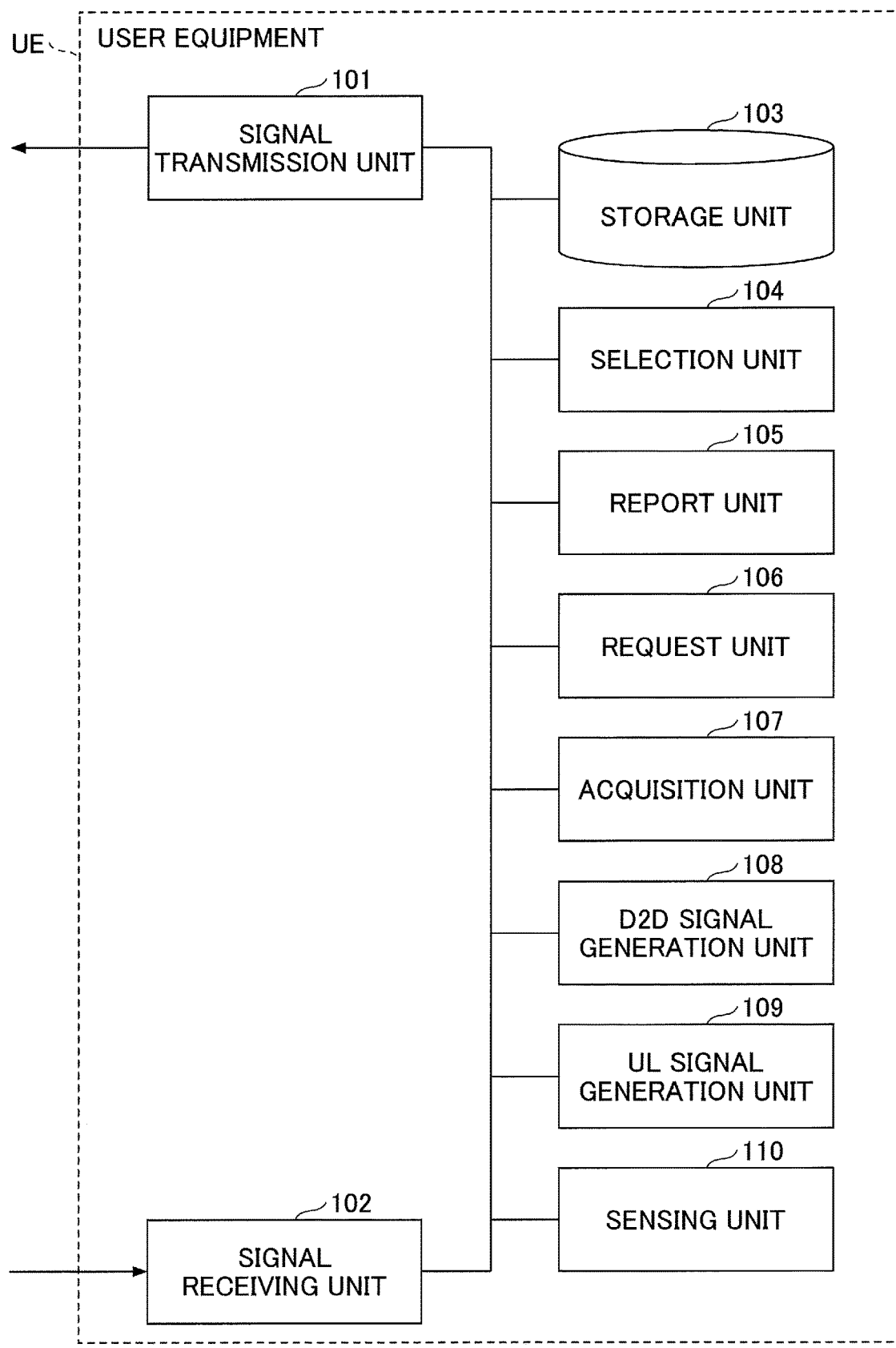
FIG. 20 is a diagram illustrating an example of the functional configuration of user equipment according to an embodiment.

FIG. 20 is a diagram illustrating an example of the functional configuration of user equipment according to an embodiment. As shown in FIG. 20, the user equipment UE has a signal transmission unit 101, a signal receiving unit 102, a storage unit 103, a selection unit 104, a report unit 105, a request unit 106, an acquisition unit 107, a D2D signal generation unit 108, a UL signal generation unit 109, and a sensing unit 110. In addition, FIG. 20 shows only functional units particularly relevant to the embodiment of the invention in the user equipment UE, and there is also a function (not shown) for performing at least an operation conforming to LTE. In addition, the functional configuration shown in FIG. 20 is just an example. As long as the operation according to the present embodiment can be performed, any functional division and any name of each functional unit can be used. However, a part of the processing (only some of the transmission methods, modification examples, or the like) of the user equipment UE described so far may be executable.

The signal transmission unit 101 has a D2D signal transmission function and a transmission function of cellular communication, and includes a function of generating various signals of the physical layer from the D2D signal generated by the D2D signal generation unit 108 or the UL signal generated by the UL signal generation unit 109 and wirelessly transmitting the various signals.

In addition, the signal transmission unit 101 has a function of transmitting the D2D signal in the Gap period indicated by the Gap pattern.

In addition, the signal transmission unit 101 has a function of determining the priority between the D2D signal and the UL signal and transmitting the D2D signal or the UL signal determined to have a high priority. More specifically, in a case where the D2D signal is notified from the D2D signal generation unit 108 and the UL signal is notified from the UL signal generation unit 109, the signal transmission unit 101 transmits the D2D signal notified from the D2D signal generation unit 108 in a case where the D2D signal has a higher priority than the UL signal. In addition, in a case where the D2D signal is notified from the D2D signal generation unit 108 and the UL signal is notified from the UL signal generation unit 109, the signal transmission unit 101 transmits the UL signal notified from the UL signal generation unit 109 in a case where the D2D signal has a lower priority than the UL signal. In addition, the signal transmission unit 101 may determine the priority between the D2D signal and the UL signal based on the identifier indicating which of the UL and the V2X notified from the D2D signal generation unit 108 is to be prioritized.

The signal receiving unit 102 includes a function of wirelessly receiving various kinds of signals from other units of user equipment UE or the base station eNB and acquiring a signal of a higher layer from the received signal of the physical layer. In addition, the signal receiving unit 102 has a D2D signal receiving function and a reception function of cellular communication.

The storage unit 103 has a function of storing a Gap pattern indicating a Gap period repeatedly set in the radio resource for UL.

The selection unit 104 has a function of selecting (reselecting) a radio resource for transmitting the D2D signal at a predetermined period. In addition, the selection unit 104 may select (reselect) a radio resource for transmitting the D2D signal at a predetermined period in a case where the priority of D2D communication is higher than the priority of UL communication. In addition, the selection unit 104 has a function of storing a Gap pattern, which includes the selected (reselected) radio resource in the Gap period, in the storage unit 103. In addition, the selection unit 104 may store a Gap pattern, of which a Gap period is a selected (reselected) radio resource (subframe) and a predetermined number of subframes before and after the selected (reselected) radio resource (subframe), in the storage unit 103.

The report unit 105 has a function of reporting the radio resource selected (reselected) by the selection unit 104 to the base station eNB.

The request unit 106 has a function of requesting the base station eNB to determine a Gap pattern corresponding to the radio resource selected (reselected) by the selection unit 104. In addition, the request unit 106 may transmit a Gap pattern request signal, which is for requesting the determination of a Gap pattern corresponding to the radio resource selected (reselected) by the selection unit 104, to the base station. In addition, the request unit 106 may generate a candidate for the Tx Gap pattern including the resource selected (reselected) by the selection unit 104, and may make the generated Tx Gap pattern candidate be included in the Gap pattern request signal.

In addition, the request unit 106 has a function of requesting the base station eNB to allocate a radio resource for enabling the transmission of the D2D signal at a predetermined period. In addition, the request unit 106 has a function of requesting the base station eNB to determine (set) a Gap pattern for reception.

The acquisition unit 107 has a function of acquiring the GAP pattern determined by the base station eNB from the base station eNB and storing the GAP pattern in the storage unit 103.

In addition, the acquisition unit 107 has a function of acquiring resource allocation information, which indicates a radio resource for enabling the transmission of the D2D signal at a predetermined period, from the base station eNB and storing a Gap pattern, which includes the radio resource allocated by the base station eNB indicated by the resource allocation information in the Gap period, in the storage unit 103. In addition, the acquisition unit 107 may store a Gap pattern, of which a Gap period is an allocated radio resource (subframe) and a predetermined number of subframes before and after the allocated radio resource (subframe), in the storage unit 103.

In addition, the acquisition unit 107 has a function of acquiring a Gap pattern for reception from the base station eNB and storing the Gap pattern for reception in the storage unit 103.

The D2D signal generation unit 108 has a function of generating a D2D signal. In addition, the D2D signal generation unit 108 transmits the TB (or the MAC PDU) of the generated D2D signal to the signal transmission unit 101. In addition, when transmitting the TB (or the MAC PDU) of the generated D2D signal to the signal transmission unit 101, the D2D signal generation unit 108 may further transmit an identifier, which indicates which of the V2X and the UL is to be prioritized, to the signal transmission unit 101.

The UL signal generation unit 109 has a function of generating a UL signal. In addition, the UL signal generation unit 109 transmits the TB (or the MAC PDU) of the generated UL signal to the signal transmission unit 101.

The sensing unit 110 has a function of detecting one or more resources capable of transmitting the D2D signal by performing sensing within the Gap period for reception indicated by the Gap pattern for reception.

(Base Station)

Figure 21:
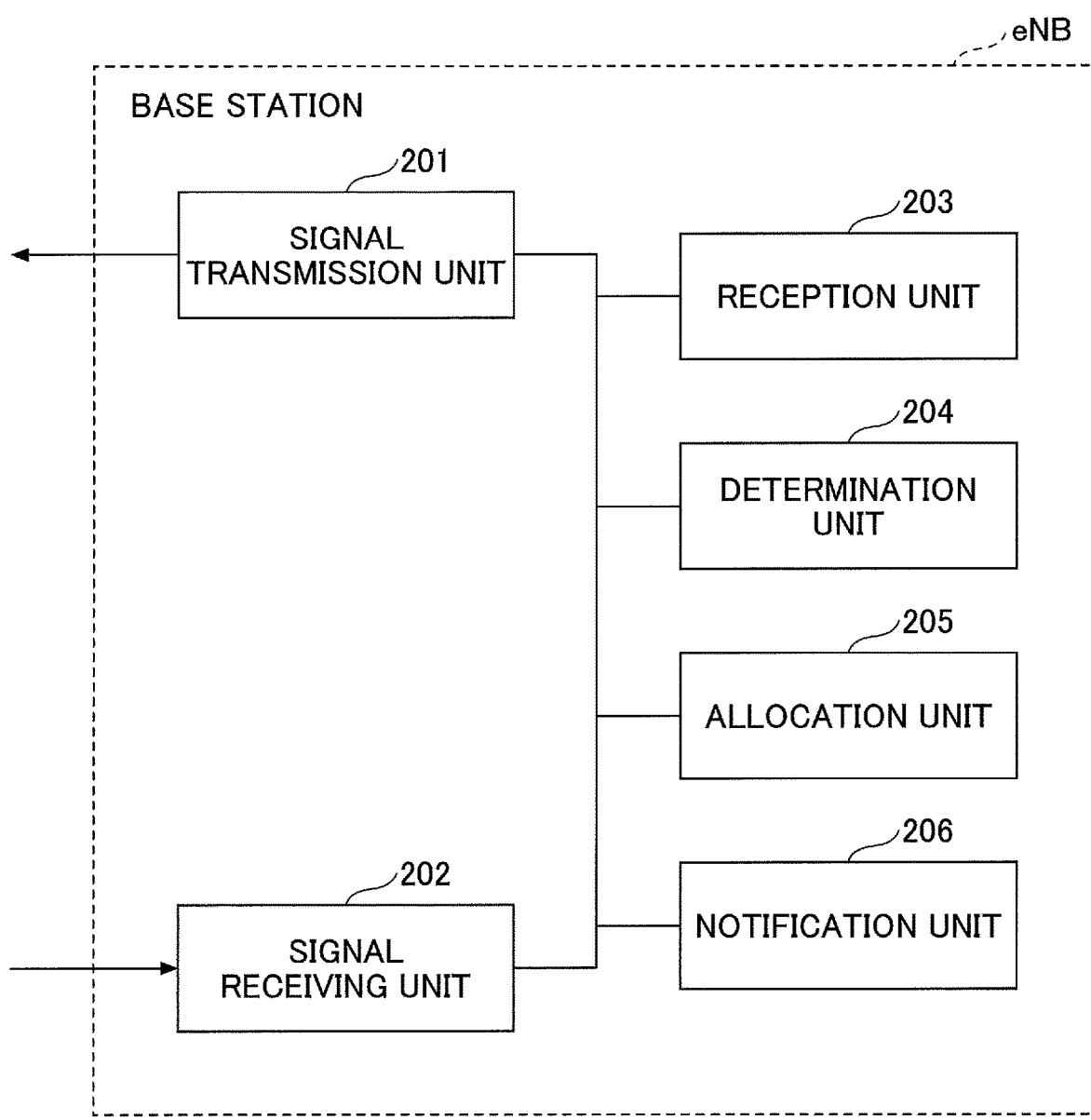
FIG. 21 is a diagram illustrating an example of the functional configuration of a base station according to an embodiment.

FIG. 21 is a diagram illustrating an example of the functional configuration of a base station according to an embodiment. As shown in FIG. 21, the base station eNB has a signal transmission unit 201, a signal receiving unit 202, a reception unit 203, a determination unit 204, an allocation unit 205, and a notification unit 206. In addition, FIG. 21 shows only functional units particularly relevant to the embodiment of the invention in the base station eNB, and there is also a function (not shown) for performing at least an operation conforming to LTE. In addition, the functional configuration shown in FIG. 21 is just an example. As long as the operation according to the present embodiment can be performed, any functional division and any name of each functional unit can be used. However, a part of the processing (only some of the transmission methods, modification examples, or the like) of the base station eNB described so far may be executable.

The signal transmission unit 201 includes a function of generating various kinds of signals of the physical layer from signals of the upper layer to be transmitted from the base station eNB and wirelessly transmitting the signals. The signal receiving unit 202 includes a function of wirelessly receiving various kinds of signals from the user equipment UE and acquiring a signal of a higher layer from the received signal of the physical layer.

The reception unit 203 has a function of receiving various kinds of requests from the user equipment UE. For example, the reception unit 203 has a function of receiving a Gap pattern request, a report of the radio resource selected (reselected) by the user equipment UE, a request for radio resource allocation, and the like from the user equipment UE.

The determination unit 204 has a function of determining a Gap pattern (Tx Gap pattern or Rx Gap pattern) based on the Gap pattern (Tx Gap pattern or Rx Gap pattern) request from the user equipment UE. In addition, the determination unit 204 has a function of determining (recognizing) a Gap pattern (Tx Gap pattern) based on the report of the radio resource selected (reselected) by the user equipment UE.

The allocation unit 205 has a function of allocating a radio resource based on the radio resource allocation request from the user equipment UE.

The notification unit 206 has a function of notifying the user equipment UE of the Gap pattern determined by the determination unit 204 or the radio resource allocated by the allocation unit 205.

<Hardware Configuration>

The block diagrams (FIGS. 20 and 21) used in the description of the above embodiment show blocks of functional units. These functional blocks (constituent units) are realized by arbitrary combination of hardware and/or software. In addition, means for realizing each functional block is not particularly limited. That is, each functional block may be realized by one device physically and/or logically combined, or may be realized by directly and/or indirectly (for example, by cable and/or wirelessly) connecting two or more devices (a plurality of devices) that are physically and/or logically separated from each other.

Figure 22:
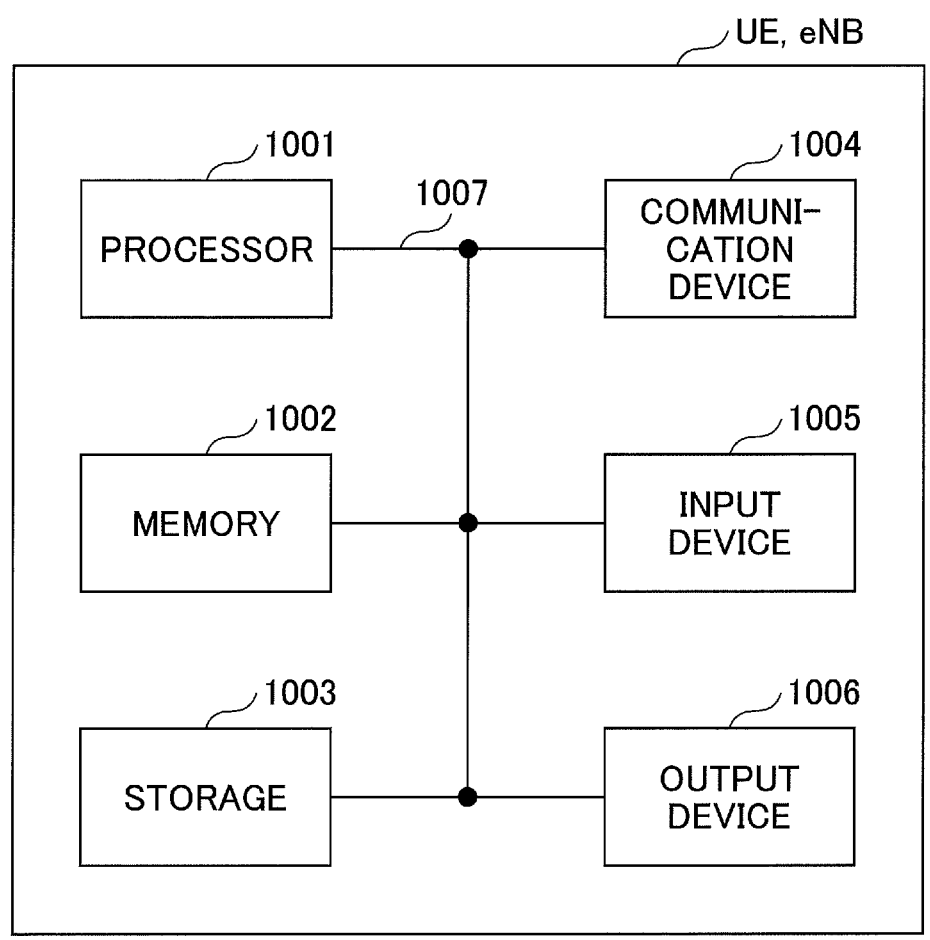
FIG. 22 is a diagram illustrating an example of the hardware configuration of user equipment and a base station according to an embodiment.

For example, the user equipment UE and the base station eNB in one embodiment of the invention may function as a computer that performs the processing of the signal transmission method of the invention. FIG. 22 is a diagram illustrating an example of the hardware configuration of the user equipment UE and the base station eNB according to an embodiment. The user equipment UE and the base station eNB described above may be physically configured as a computer device including a processor 1001, a memory 1002, a storage 1003, a communication device 1004, an input device 1005, an output device 1006, a bus 1007, and the like.

In addition, in the following explanation, a term "equipment" can be read as a circuit, a device, a unit, and the like. The hardware configuration of the user equipment UE and the base station eNB may be configured so as to include one or a plurality of devices shown in the diagram, or may be configured without including some devices.

Each function in the user equipment UE and the base station eNB is realized by loading predetermined software (program) on the hardware, such as the processor 1001 and the memory 1002, so that the processor 1001 performs calculation and by controlling the communication of the communication device 1004 and the reading and/or writing of data in the memory 1002 and the storage 1003.

The processor 1001 controls the entire computer by operating the operating system, for example. The processor 1001 may be configured by a central processing unit (CPU) including an interface with a peripheral device, a control device, an arithmetic device, a register, and the like. For example, the signal transmission unit 101, the signal receiving unit 102, the storage unit 103, the selection unit 104, the report unit 105, the request unit 106, the acquisition unit 107, the D2D signal generation unit 108, the UL signal generation unit 109, and the sensing unit 110 of the user equipment UE and the signal transmission unit 201, the signal receiving unit 202, the reception unit 203, the determination unit 204, the allocation unit 205, and the notification unit 206 of the base station eNB may be realized by the processor 1001.

In addition, the processor 1001 reads a program (program codes), a software module, or data from the storage 1003 and/or the communication device 1004 to the memory 1002, and executes various kinds of processing according to these. As the program, a program causing a computer to execute at least some of the operations described by the above embodiment is used. For example, the signal transmission unit 101, the signal receiving unit 102, the storage unit 103, the selection unit 104, the report unit 105, the request unit 106, the acquisition unit 107, the D2D signal generation unit 108, the UL signal generation unit 109, and the sensing unit 110 of the user equipment UE and the signal transmission unit 201, the signal receiving unit 202, the reception unit 203, the determination unit 204, the allocation unit 205, and the notification unit 206 of the base station eNB may be realized by a control program that is stored in the memory 1002 and operates on the processor 1001, and other functional blocks may be similarly realized. Although it has been described that the above-described various kinds of processing are executed by one processor 1001, the various kinds of processing may also be executed simultaneously or sequentially by two or more processors 1001. The processor 1001 may be implemented by one or more chips. In addition, a program may be transmitted from the network through the electric communication line.

The memory 1002 is a computer-readable recording medium. For example, the memory 1002 may be configured by at least one of a Read Only Memory (ROM), an Erasable Programmable ROM (EPROM), an Electrically Erasable Programmable ROM (EEPROM), and a Random Access Memory (RAM). A memory 1002 may be referred to as a register, a cache, a main memory (main memory device), or the like. The memory 1002 can store a program (program codes), a software module, and the like that can be executed in order to implement the signal transmission method according to one embodiment of the invention.

The storage 1003 is a computer-readable recording medium. For example, the storage 1003 may be configured by at least one of an optical disc such as a Compact Disc ROM (CD-ROM), a hard disk drive, a flexible disk, a magneto-optical disc (for example, a compact disc, a digital versatile disc, a Blu-ray (registered trademark) disc), a smart card, a flash memory (for example, a card, a stick, and a key drive), a floppy (registered trademark) disk, a magnetic strip, and the like. The storage 1003 may be referred to as an auxiliary storage device. The above-described storage media may be, for example, a database including the memory 1002 and/or the storage 1003, a server, and other appropriate media.

The communication device 1004 is hardware (transceiver device) for performing communication between computers through a cable and/or radio network. For example, the communication device 1004 is also referred to as a network device, a network controller, a network card, a communication module, and the like. For example, the signal transmission unit 101 and the signal receiving unit 102 of the user equipment UE and the signal transmission unit 201 and the signal receiving unit 202 of the base station eNB may be realized by the communication device 1004.

The input device 1005 is an input device (for example, a keyboard, a mouse, a microphone, a switch, a button, and a sensor) for receiving an input from the outside. The output device 1006 is an output device (for example, a display, a speaker, and an LED lamp) for output to the outside. In addition, the input device 1005 and the output device 1006 may be a united structure (for example, a touch panel).

In addition, respective devices, such as the processor 1001 and the memory 1002, are connected to each other by the bus 1007 for communicating information. The bus 1007 may be a single bus, or may be configured to include different buses between devices.

In addition, the user equipment UE and the base station eNB may be configured to include hardware, such as a microprocessor, a Digital Signal Processor (DSP: Digital Signal Processor), an Application Specific Integrated Circuit (ASIC), a Programmable Logic Device (PLD), and a Field Programmable Gate Array (FPGA), and some or all of the respective functional blocks may be realized by the hardware. For example, the processor 1001 may be implemented by at least one of the hardware components.

<Summary>

As described above, according to the embodiment, there is provided user equipment of a radio communication system that supports D2D communication including a storage that stores a Gap pattern indicating a Gap period repeatedly configured in a radio resource for UL; and a transmitter that transmits a signal of D2D communication in a Gap period indicated by the Gap pattern stored in the storage. According to the user equipment UE, there is provided a technique capable of preferentially performing D2D communication depending on necessity.

In addition, the user equipment UE may further include: a selector that selects a radio resource for transmitting a signal of the D2D communication at a predetermined period; a requestor that requests a base station to determine a Gap pattern corresponding to the radio resource selected by the selector; and an obtainer that obtains a Gap pattern determined by the base station from the base station and stores the Gap pattern in the storage. As a result, the user equipment UE can leave the determination of a Gap pattern to the base station eNB.

In addition, the user equipment UE may further include a selector that selects a radio resource for transmitting a signal of D2D communication at a predetermined period when priority of D2D communication is higher than priority of UL communication; and a communicator that reports the radio resource selected by the selector to the base station. The selector may store, in the storage, a Gap pattern such that the selected radio resource is included in a Gap period. As a result, when the D2D communication has a higher priority than the UL communication, the user equipment UE can select a radio resource for periodically transmitting the D2D signal by itself and can determine the Gap pattern by itself.

In addition, the user equipment UE may further include a requester that requests, from a base station, allocation information of a radio resource for enabling transmission of a signal of the D2D communication at a predetermined period; and an obtainer that obtains, from the base station, resource allocation information indicating a radio resource for enabling transmission of the signal of the D2D communication at a predetermined period and stores, in the storage, a Gap pattern such that the radio resource allocated by the base station, the radio resource indicated by the obtained resource allocation information, is included in a Gap period. As a result, the user equipment UE can leave the allocation of radio resources to the base station eNB, and can recognize the Gap pattern by itself.

In addition, according to the embodiment, there is provided user equipment of a radio communication system that supports D2D communication. The user equipment includes a first generator that, generates a signal of D2D communication; a second generator that generates a UL signal; and a transmitter that determines a priority between the signal of the D2D communication and the UL signal and transmits the signal of the D2D communication or the UL signal determined to have a higher priority. Upon detecting that the signal of the D2D communication is notified from the first generator and the UL signal is notified from the second generator, the transmitter transmits the signal of the D2D communication notified from the first generator when the signal of the D2D communication has a higher priority than the UL signal. According to the user equipment UE, a technique is provided, which allows D2D communication to be preferentially performed depending on necessity.

In addition, according to the embodiment, there is provided a signal transmission method to be executed by user equipment of a radio communication system that supports D2D communication. The signal transmission method includes storing, in a storage, a Gap pattern indicating a Gap period repeatedly configured in a radio resource for UL; and transmitting a signal of D2D communication in a Gap period indicated by the Gap pattern stored in the storage. According to the signal transmission method, there is provided a technique capable of preferentially performing D2D communication depending on necessity.

<Supplement to Embodiments>

The "radio resource for transmitting a D2D signal at a predetermined period" may be referred to as a resource for transmitting a D2D signal semi-persistently, or may be referred to as a resource semi-persistently scheduled to transmit a D2D signal.

The notification of information is not limited to the aspects/embodiments described in this specification, but may be performed using other methods. For example, the notification of information may be performed by physical layer signaling (for example, Downlink Control Information (DCI) and Uplink Control Information (UCI)), upper layer signaling (for example, RRC signaling, MAC signaling, and broadcast information (Master Information Block (MIB) and System Information Block (SIB)), other signals, or a combination thereof. In addition, the RRC message may be referred to as RRC signaling. In addition, the RRC message may be, for example, an RRC Connection Setup message, an RRC Connection Reconfiguration message, or the like.

Each aspect/embodiment described in this specification may be applied to systems using Long Term Evolution (LTE), LTE-Advanced (LTE-A), SUPER 3G IMT-Advanced, 4G, 5G, Future Radio Access (FRA), W-CDMA (registered trademark), GSM (registered trademark), CDMA2000, Ultra Mobile Broadband (UMB), IEEE802.11 (Wi-Fi), IEEE 802.16 (WiMAX), IEEE 802.20 Ultra-Wide-Band (UWB), Bluetooth (registered trademark), and other appropriate systems and/or next-generation systems expanded based on these.

The input and output information and the like may be stored in a specific place (for example, a memory), or may be managed by a management table. The input and output information and the like can be overwritten, updated, or added. The output information and the like may be deleted. The input information may be transmitted to other devices.

Determination or decision may be performed according to a value (0 or 1) represented by 1 bit, or may be performed by a Boolean value (true or false), or may be performed by comparison of numerical values (for example, comparison with a predetermined value).

The information, signals, and the like described in this specification may be expressed using any of various different techniques. For example, data, an indication, commands, information, signals, bits, symbols, chips, and the like that may be mentioned throughout the above-mentioned description may be expressed as voltages, currents, electromagnetic waves, magnetic fields or magnetic particles, optical fields or photons, or any combination thereof.

In addition, the terms described in this specification and/or terms necessary for understanding this specification may be replaced with terms having the same or similar meaning. For example, a channel and/or symbol may be a signal. In addition, a signal may be a message.

The user equipment UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The order of the processes, sequences, flowcharts, and the like of each aspect/embodiment described in this specification may be changed as long as there is no inconsistency. For example, for the methods described in this specification, the elements of various steps are presented in an exemplary order, and the methods are not limited to the specific orders presented.

Each aspect/embodiment described in this specification may be used alone or in combination, or may be used while being switched according to the execution. In addition, the notification of predetermined information (for example, notification of "being X") is not limited to being performed clearly, but may be performed implicitly (for example, there is no notification of the predetermined information). The terms "determination (determining)" and "decision (determining)" used in this specification may include a wide variety of operations. For example, calculating, computing, processing, deriving, investigating, looking up (for example, looking up in a table, a database, or other data structures), and ascertaining can be regarded as "determining". In addition, receiving (for example, receive information), transmitting (for example, transmitting information), input, output, and accessing (for example, accessing data in a memory) can be regarded as "determining". In addition, resolving, selecting, choosing, establishing, comparing, and the like can be regarded as "determining". That is, "determining" may include "determining" a certain operation.

A description "based on" used in this specification does not mean "based only on" unless otherwise stated. In other words, the description "based on" means both "based only on" and "based at least on".

While the invention has been described in detail above, it is apparent to those skilled in the art that the invention is not limited to the embodiment described in this specification. The invention can be modified and changed without departing from the spirit and scope of the invention as defined by the claims. Accordingly, the description of this specification is for the purpose of illustration, and does not have any restrictive meaning to the invention.

This international patent application is based on and claims priority to Japanese Patent Application No. 2016-096574 filed on May 12, 2016, and the entire content of Japanese Patent Application No. 2016-096574 is incorporated herein by reference.

LIST OF REFERENCE SYMBOLS

UE user equipment
eNB base station
101 signal transmission unit
102 signal receiving unit
103 storage unit
104 selection unit
105 report unit
106 request unit
107 acquisition unit
108 D2D signal generation unit
109 UL signal generation unit
110 sensing unit
201 signal transmission unit
202 signal receiving unit
203 reception unit
204 determination unit
205 allocation unit
206 notification unit
1001 processor
1002 memory
1003 storage
1004 communication device
1005 input device
1006 output device

The invention claimed is:

1. User equipment of a radio communication system that supports D2D communication, the user equipment comprising:
   a processor coupled to a memory that selects a radio resource for transmitting a signal of the D2D communication at a predetermined period, and that requests a base station to determine a Gap pattern corresponding to the radio resource selected by the processor; and
   a receiver that obtains a Gap pattern determined by the base station from the base station; and
   wherein the processor stores the Gap pattern obtained from the base station, the Gap pattern indicating a Gap period repeatedly configured in a radio resource for UL;
   wherein the user equipment further includes a transmitter that transmits a signal of the D2D communication in the Gap period indicated by the Gap pattern stored in the memory,
   wherein the processor includes information indicating priority of data to be transmitted in a Gap pattern request signal for requesting the base station to determine the Gap pattern corresponding to the radio resource selected by the processor and transmits the Gap pattern request signal to the base station.

2. The user equipment according to claim 1, wherein
   the processor further selects a radio resource for transmitting a signal of the D2D communication at a predetermined period when priority of the D2D communication is higher than priority of UL communication,
   wherein the transmitter further reports the radio resource selected by the processor to the base station, and
   wherein the processor stores, in the memory, a Gap pattern such that the selected radio resource is included in a Gap period.

3. The user equipment according to claim 1,
   wherein the processor further requests, from a base station, allocation information of a radio resource for enabling transmission of a signal of the D2D communication at a predetermined period, and
   wherein the receiver further obtains, from the base station, resource allocation information indicating radio resource for enabling transmission of the signal of the D2D communication at a predetermined period and stores, in the memory, a Gap pattern such that the radio resource allocated by the base station, the radio resource indicated by the acquired resource allocation information, is included in a Gap period.

4. A signal transmission method to be executed by user equipment of a radio communication system that supports D2D communication, the signal transmission method comprising:
   selecting a radio resource for transmitting a signal of the D2D communication at a predetermined period, and requesting a base station to determine a Gap pattern corresponding to the radio resource selected;
   obtaining a Gap pattern determined by the base station from the base station;

storing, in a memory, the Gap pattern obtained from the base station, the Gap pattern indicating a Gap period repeatedly configured in a radio resource for UL; and transmitting a signal of the D2D communication in a Gap period indicated by the Gap pattern stored in the memory, wherein the user equipment includes information indicating priority of data to be transmitted in a Gap pattern request signal for requesting the base station to determine the Gap pattern corresponding to the radio resource selected and transmits the Gap pattern request signal to the base station.

* * * * *